United States Patent
Ge et al.

(10) Patent No.: US 12,279,267 B2
(45) Date of Patent: Apr. 15, 2025

(54) MULTI-DOWNLINK CONTROL INFORMATION BASED TRANSMISSION METHOD, DEVICE, SYSTEM, AND STORAGE MEDIUM

(71) Applicant: HUAWEI TECHNOLOGIES CO., LTD., Shenzhen (CN)

(72) Inventors: Shibin Ge, Shanghai (CN); Haicun Hang, Shanghai (CN); Liuliu Ji, Shanghai (CN); Xiaohan Wang, Shanghai (CN); Xiaoyan Bi, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 350 days.

(21) Appl. No.: 17/401,503

(22) Filed: Aug. 13, 2021

(65) Prior Publication Data

US 2021/0377923 A1 Dec. 2, 2021

Related U.S. Application Data

(63) Continuation of application No. PCT/CN2019/129635, filed on Dec. 28, 2019.

(30) Foreign Application Priority Data

Feb. 15, 2019 (CN) .......................... 201910117625.9

(51) Int. Cl.
*H04W 72/232* (2023.01)
*H04W 8/24* (2009.01)
(Continued)

(52) U.S. Cl.
CPC ............. *H04W 72/23* (2023.01); *H04W 8/24* (2013.01); *H04W 72/0446* (2013.01); *H04W 72/0453* (2013.01); *H04W 72/1263* (2013.01)

(58) Field of Classification Search
CPC . H04W 24/10; H04W 72/0453; H04W 74/00; H04W 72/0446; H04W 72/232; H04W 72/044
See application file for complete search history.

(56) References Cited

U.S. PATENT DOCUMENTS 9,635,621 B2 * 4/2017 Papasakellariou .... H04L 1/1812
2012/0014369 A1 1/2012 Venkob et al.
(Continued)

FOREIGN PATENT DOCUMENTS

CN 108282876 A 7/2018
CN 108738145 A 11/2018
(Continued)

OTHER PUBLICATIONS

Intel Corporation: "Discussion on multi-TRP/multi-panel transmission" 3GPP Draft; R1-1812509, Nov. 11, 2018, XP051554453.
(Continued)

*Primary Examiner* — Tu X Nguyen
(74) *Attorney, Agent, or Firm* — Rimon PC

(57) ABSTRACT

This application provides a multi-downlink control information (DCI)-based transmission method. In the method, a terminal reports information about a capability of the terminal to support multi-DCI transmission, or a network device sends indication information of the types or the quantity of multi-DCI-based transmissions to a terminal. The network device performs resource scheduling on the terminal on this basis, thereby helping improve resource scheduling efficiency and reduce processing complexity of the terminal. In addition, this application also provides a corresponding solution for a scenario in which a carrier aggregation/dual connectivity (CA/DC) DCI-based transmission scenario coexists with multi-DCI (DCI)-based transmission, thereby helping the terminal share a multi-DCI DCI-based transmission capability and a CA/DC (DCI)-

(Continued)

based transmission capability to improve a processing capability of the terminal.

17 Claims, 11 Drawing Sheets

(51) Int. Cl.
*H04W 72/0446* (2023.01)
*H04W 72/0453* (2023.01)
*H04W 72/1263* (2023.01)
*H04W 72/23* (2023.01)

(56) References Cited

U.S. PATENT DOCUMENTS

| | | | |
|---|---|---|---|
| 2019/0045532 A1 | 2/2019 | Zhu et al. | |
| 2021/0314100 A1* | 10/2021 | Yeo | H04B 7/0417 |
| 2021/0360687 A1* | 11/2021 | Suzuki | H04W 72/1268 |

FOREIGN PATENT DOCUMENTS

| | | |
|---|---|---|
| CN | 109089322 A | 12/2018 |
| CN | 109152072 A | 1/2019 |
| CN | 109286983 A | 1/2019 |
| EP | 3264844 A1 | 1/2018 |
| EP | 3490184 A1 | 5/2019 |
| WO | 2017133264 A1 | 8/2017 |
| WO | 2018016907 A1 | 1/2018 |
| WO | 2018228500 A1 | 12/2018 |
| WO | 2018231812 A1 | 12/2018 |

OTHER PUBLICATIONS

3GPP TS 38.306 V15.4.0 (Dec. 2018), 3rd Generation Partnership Project; Technical Specification Group Radio Access Network; NR; User Equipment (UE) radio access capabilities(Release 15), 44 pages.
3GPP TS 38.331 V15.4.0 (Apr. 2019), 3rd Generation Partnership Project; Technical Specification; "5G; NR; Radio Resource Control (RRC) protocol specification(Release 15)", ETSI TS 138 331 v15.4, 471 pages.

* cited by examiner

MULTI-DOWNLINK CONTROL INFORMATION BASED TRANSMISSION METHOD, DEVICE, SYSTEM, AND STORAGE MEDIUM

CROSS-REFERENCE TO RELATED APPLICATIONS

This application is a continuation of International Application No. PCT/CN2019/129635, filed on Dec. 28, 2019, which claims priority to Chinese Patent Application No. 201910117625.9, filed on Feb. 15, 2019. The disclosures of the aforementioned applications are hereby incorporated by reference in their entireties.

TECHNICAL FIELD

This application relates to the field of communications technologies, and in particular, to a multi-downlink control information based transmission method, a device, a system, and a storage medium.

BACKGROUND

In a new radio (NR) communications system, higher requirements are imposed on a system capacity, an instantaneous peak rate, spectral efficiency, a throughput of a cell edge user, a delay, and the like. A multiple transmission reception point transmission (multi-TRP transmission) technology is shown in FIG. 1. In both uplink transmission and downlink transmission, the technology can improve system performance, resolve a problem of inter-cell interference, increase a throughput of a cell edge user, and improve cell-edge spectral efficiency.

Based on types of transmission reception point backhaul (TRP backhaul) participating in multi-site coordination, the multi-site coordination is classified into an ideal backhaul scenario and a non-ideal backhaul scenario. In ideal backhaul, it is considered that a communication delay between two TRPs is at a microsecond level, and can be ignored when compared with that in millisecond-level scheduling in NR. In non-ideal backhaul, a communication delay between two TRPs is at a millisecond level, and cannot be ignored when compared with that in millisecond-level scheduling in NR.

To ensure multi-site coordination performance in non-ideal backhaul, each TRP needs to send downlink control information (DCI), schedule a physical downlink shared channel (PDSCH) of the TRP, and perform data transmission. This manner is generally referred to as a multi-downlink control information based multiple transmission reception point (multi-DCI based multi-TRP) transmission solution, and is subsequently referred to as multi-downlink control information (multi-DCI) based transmission for short. In this multi-DCI based transmission, because one terminal corresponds to at least two physical downlink control channels (PDCCH) or PDSCHs, processing complexity of the terminal increases. This is a technical problem that needs to be urgently resolved.

SUMMARY

This application provides a multi-downlink control information based transmission method, a device, a system, and a storage medium, to resolve a problem of high processing complexity of a terminal in a multi-downlink control information based transmission mode.

The technical solutions in this application are as follows:

According to a first aspect, a multi-downlink control information based transmission method is provided. The method is performed by a terminal, and includes:

The terminal reports first capability reporting information to a network device, where the first capability reporting information indicates at least one of information indicating whether the terminal supports multi-downlink control information based transmission, a supported type of multi-downlink control information based transmission, or a supported quantity of multi-downlink control information based transmissions.

The terminal performs transmission based on resource scheduling of the network device.

According to a second aspect, a multi-downlink control information based transmission method is provided. The method is performed by a network device, and includes:

The network device receives first capability reporting information reported by a terminal, where the first capability reporting information indicates at least one of information indicating whether the terminal supports multi-downlink control information based transmission, a supported type of multi-downlink control information based transmission, or a supported quantity of multi-downlink control information based transmissions.

The network device schedules, based on the first capability reporting information, the terminal to perform transmission.

The multi-downlink control information based transmission method provided in the first aspect or the second aspect is implemented, where the terminal reports at least one of the information indicating whether the terminal supports multi-downlink control information based transmission, the supported type of the multi-downlink control information based transmission, or the supported quantity of multi-downlink control information based transmissions; and after learning of a capability of the terminal, the network device may more properly schedule the terminal to perform transmission, thereby reducing processing complexity of the terminal.

In a possible implementation of the first aspect or the second aspect, that the first capability reporting information indicates whether the terminal supports multi-downlink control information based transmission includes:

on one time-frequency resource unit, whether the terminal supports an overlapping physical downlink shared channel or physical uplink shared channel; or on one frequency domain resource unit, whether the terminal supports an overlapping physical downlink shared channel or physical uplink shared channel; or on one time domain resource unit, whether the terminal supports an overlapping physical downlink shared channel or physical uplink shared channel; or on one time-frequency resource segment, whether the terminal supports an overlapping physical downlink shared channel or physical uplink shared channel, where the time-frequency resource segment includes one or more time-frequency resource units; or on one frequency domain resource segment, whether the terminal supports an overlapping physical downlink shared channel or physical uplink shared channel, where the frequency domain resource segment includes one or more frequency domain resource units; or on one time domain resource segment, whether the terminal supports an overlapping physical downlink shared channel or physical uplink shared channel, where the time domain resource segment includes one or more time domain resource units.

The terminal reports whether the terminal supports an overlapping PDSCH or PUSCH on one resource unit or one resource segment, that is, whether the terminal supports multi-DCI based transmission is indicated, so that the network device may properly schedule, based on a capability of the terminal to support multi-DCI based transmission, the terminal to perform multi-DCI based transmission when the terminal supports multi-DCI based transmission, and not schedule the terminal to perform multi-DCI based transmission when the terminal does not support multi-DCI based transmission.

In another possible implementation of the first aspect or the second aspect, the first capability reporting information indicates the type of the multi-downlink control information based transmission that is supported by the terminal, and the type indicates a quantity of overlapping physical downlink shared channels or physical uplink shared channels that is supported by the terminal on one resource unit.

Optionally, the type includes:
  a maximum quantity of overlapping physical downlink shared channels or physical uplink shared channels that is supported by the terminal on one time-frequency resource unit; or
  a maximum quantity of overlapping physical downlink shared channels or physical uplink shared channels that is supported by the terminal on one frequency domain resource unit; or
  a maximum quantity of overlapping physical downlink shared channels or physical uplink shared channels that is supported by the terminal on one time domain resource unit.

The maximum quantity belongs to {1, 2}, {1, 2, 3}, or {1, 2, 3, 4}.

When the maximum quantity is 1, it indicates that the terminal supports only one physical downlink shared channel or physical uplink shared channel, that is, it indicates that an overlapping physical downlink shared channel or physical uplink shared channel is not supported.

The terminal reports the type of the multi-DCI based transmission that is supported by the terminal, and based on a maximum quantity of overlapping PDSCHs or PUSCHs that is supported by the terminal on one resource unit, the network device may schedule a PDSCH or a PUSCH whose quantity does not exceed the maximum quantity, or schedule a PDSCH and a PUSCH, to perform transmission, to maximize the use of a processing capability of the terminal.

In another possible implementation of the first aspect or the second aspect, the first capability reporting information indicates that the quantity of multi-downlink control information based transmissions that is supported by the terminal is a transmission quantity, and the transmission quantity indicates a total quantity of "multi-downlink control information based transmissions" that is supported by the terminal on one resource segment. In other words, the terminal reports a supported quantity of "multi-downlink control information based transmissions" on one resource segment, so that the network device obtains a capability of the terminal to support "multi-downlink control information based transmission".

One "multi-downlink control information based transmission" may occupy one or more time domain resource units, and in one time domain resource segment, a plurality of "multi-downlink control information based transmissions" occupying different time domain resource units may be included. The supported transmission quantity of "multi-downlink control information based transmissions" that is reported by the terminal refers to a sum of quantities of "multi-downlink control information based transmissions" that are supported in the time domain resource segment.

In another possible implementation of the first aspect or the second aspect, the first capability reporting information indicates that the quantity of multi-downlink control information based transmissions that is supported by the terminal is a resource quantity, and on a resource unit corresponding to the resource quantity, the terminal supports an overlapping physical downlink shared channel or physical uplink shared channel.

The resource quantity includes:
  a quantity of time-frequency resource units for the multi-downlink control information based transmission that is supported by the terminal; or
  a quantity of frequency domain resource units for the multi-downlink control information based transmission that is supported by the terminal; or
  a quantity of time domain resource units for the multi-downlink control information based transmission that is supported by the terminal.

The terminal reports, to the network device, a quantity of resource units for the overlapping multi-DCI based transmission that is supported by the terminal, and the network device may schedule, on a resource unit corresponding to the quantity, the terminal to perform multi-DCI based transmission.

In another possible implementation of the first aspect or the second aspect, the first capability reporting information is further used to indicate a resource identifier for the multi-downlink control information based transmission that is supported by the terminal, and the resource identifier includes:
  an identifier of a time-frequency resource unit for the multi-downlink control information based transmission that is supported by the terminal; or
  an identifier of a frequency domain resource unit for the multi-downlink control information based transmission that is supported by the terminal; or
  an identifier of a time domain resource unit for the multi-downlink control information based transmission that is supported by the terminal.

The terminal reports, to the network device, an identifier of a resource unit for the multi-DCI based transmission that is supported by the terminal, and the network device may perform multi-DCI based transmission on the resource unit indicated by the identifier.

In another possible implementation of the first aspect or the second aspect, the first capability reporting information indicates that the quantity of multi-downlink control information based transmissions that is supported by the terminal is a channel quantity, and the channel quantity is a quantity of overlapping physical downlink shared channels or physical uplink shared channels that is supported by the terminal on one resource segment, and includes:
  a maximum quantity of overlapping physical downlink shared channels or physical uplink shared channels that is supported by the terminal on one time-frequency resource segment, where the time-frequency resource segment includes one or more time-frequency resource units; or
  a maximum quantity of overlapping physical downlink shared channels or physical uplink shared channels that is supported by the terminal on one frequency domain resource segment, where the frequency domain resource segment includes one or more frequency domain resource units; or a maximum quantity of overlapping physical downlink shared channels or physical uplink shared channels that is supported by the terminal on one time domain resource segment, where the time domain resource segment includes one or more time domain resource units.

The terminal reports a maximum quantity of overlapping PDSCHs or PUSCHs that is supported by the terminal on one resource segment, and the network device may learn, to some extent with reference to a resource unit included in the resource segment, the type of the multi-DCI based transmission that is supported by the terminal, to properly schedule the terminal to perform multi-DCI based transmission.

In another possible implementation of the first aspect or the second aspect, the first capability reporting information indicates a quantity of time domain resource units between "multi-downlink control information based transmissions" that is supported by the terminal on one resource segment or each resource unit.

According to a third aspect, a multi-downlink control information based transmission method is provided. The method is performed by a terminal, and includes:

The terminal receives first indication information delivered by a network device, where the first indication information indicates at least one of types or a quantity of multi-downlink control information based transmissions that are supported by the terminal.

For the first indication information delivered by the network device to the terminal, the first indication information may be directly indicated by the network device to the terminal without considering a capability reported by the terminal, or may be types or a quantity of multi-downlink control information based transmissions needing to be supported by the terminal that is determined by the network device after the network device receives the first capability reporting information reported by the terminal in the first aspect and considers a capability of the terminal. In this case, before the operation of receiving, by the terminal, first indication information delivered by a network device, the method further includes: The terminal reports first capability reporting information to the network device.

The terminal performs transmission based on resource scheduling of the network device and at least one of the types or the quantity of multi-downlink control information based transmissions.

According to a fourth aspect, a multi-downlink control information based transmission method is provided. The method is performed by a network device, and includes:

The network device delivers first indication information to a terminal, where the first indication information indicates at least one of types or a quantity of multi-downlink control information based transmissions that are supported by the terminal.

For the first indication information delivered by the network device to the terminal, the first indication information may be directly indicated by the network device to the terminal without considering a capability reported by the terminal, or may be types or a quantity of multi-downlink control information based transmissions needing to be supported by the terminal that is determined by the network device after the network device receives the first capability reporting information reported by the terminal in the first aspect and considers a capability of the terminal. In this case, before the operation of receiving, by a terminal, first indication information delivered by the network device, the method further includes: The network device receives first capability reporting information reported by the terminal.

The network device schedules the terminal to perform transmission.

The multi-downlink control information based transmission method provided in the third aspect or the fourth aspect is implemented, where the network device indicates, to the terminal, at least one of the type of the multi-downlink control information based transmission that is supported by the terminal or the supported quantity of multi-downlink control information based transmissions, so that the terminal can be properly scheduled to perform transmission, thereby reducing processing complexity of the terminal.

In a possible implementation of the third aspect or the fourth aspect, the first indication information indicates the type of the multi-downlink control information based transmission that is supported by the terminal, and the type indicates a quantity of overlapping physical downlink shared channels or physical uplink shared channels that is supported by the terminal on one resource unit.

Optionally, the type includes:
a maximum quantity of overlapping physical downlink shared channels or physical uplink shared channels that is supported by the terminal on one time-frequency resource unit; or
a maximum quantity of overlapping physical downlink shared channels or physical uplink shared channels that is supported by the terminal on one frequency domain resource unit; or
a maximum quantity of overlapping physical downlink shared channels or physical uplink shared channels that is supported by the terminal on one time domain resource unit.

The maximum quantity belongs to $\{1, 2\}$, $\{1, 2, 3\}$, or $\{1, 2, 3, 4\}$.

When the maximum quantity is 1, it indicates that the terminal supports a maximum quantity of one physical downlink shared channel or physical uplink shared channel, that is, it indicates that the terminal does not support an overlapping physical downlink shared channel or physical uplink shared channel.

The supported type of the multi-DCI based transmission is indicated to the terminal, and based on a maximum quantity of overlapping PDSCHs or PUSCHs that is supported by the terminal on one resource unit, the network device may schedule a PDSCH or a PUSCH whose quantity does not exceed the maximum quantity, or schedule a PDSCH and a PUSCH, to perform transmission, to properly schedule the terminal and reduce processing complexity of the terminal.

In another possible implementation of the third aspect or the fourth aspect, the first indication information indicates that the quantity of multi-downlink control information based transmissions that is supported by the terminal is a transmission quantity, and the transmission quantity indicates a total quantity of multi-downlink control information based transmissions that is supported by the terminal on one resource segment. In other words, the terminal reports a supported quantity of "multi-downlink control information based transmissions" on one resource segment.

One "multi-downlink control information based transmission" may occupy one or more time domain resource units, and in one time domain resource segment, a plurality of "multi-downlink control information based transmissions" occupying different time domain resource units may be included. The supported transmission quantity of "multi-downlink control information based transmissions" that is reported by the terminal refers to a sum of quantities of "multi-downlink control information based transmissions" that are supported in the time domain resource segment.

In another possible implementation of the third aspect or the fourth aspect, the first indication information indicates that the quantity of multi-downlink control information based transmissions that is supported by the terminal is a resource quantity, and on a resource unit corresponding to the resource quantity, the terminal supports an overlapping physical downlink shared channel or physical uplink shared channel.

The resource quantity includes:
- a quantity of time-frequency resource units for the multi-downlink control information based transmission that is supported by the terminal; or
- a quantity of frequency domain resource units for the multi-downlink control information based transmission that is supported by the terminal; or
- a quantity of time domain resource units for the multi-downlink control information based transmission that is supported by the terminal.

The network device indicates a supported quantity of resource units for the overlapping multi-DCI based transmission to the terminal, and the network device may schedule, on a resource unit corresponding to the quantity, the terminal to perform multi-DCI based transmission.

In another possible implementation of the third aspect or the fourth aspect, the first indication information is further used to indicate a resource identifier for the multi-downlink control information based transmission that is supported by the terminal, and the resource identifier includes:
- an identifier of a time-frequency resource unit for the multi-downlink control information based transmission that is supported by the terminal; or
- an identifier of a frequency domain resource unit for the multi-downlink control information based transmission that is supported by the terminal; or
- an identifier of a time domain resource unit for the multi-downlink control information based transmission that is supported by the terminal.

The network device indicates, to the terminal, an identifier of a resource unit for the multi-DCI based transmission that is supported by the terminal, and the network device performs multi-DCI based transmission on the resource unit indicated by the identifier.

In another possible implementation of the third aspect or the fourth aspect, the first indication information indicates that the quantity of multi-downlink control information based transmissions that is supported by the terminal is a channel quantity, and the channel quantity is a quantity of overlapping physical downlink shared channels or physical uplink shared channels that is supported by the terminal on one resource segment, and includes:
- a maximum quantity of overlapping physical downlink shared channels or physical uplink shared channels that is supported by the terminal on one time-frequency resource segment, where the time-frequency resource segment includes one or more time-frequency resource units; or
- a maximum quantity of overlapping physical downlink shared channels or physical uplink shared channels that is supported by the terminal on one frequency domain resource segment, where the frequency domain resource segment includes one or more frequency domain resource units; or
- a maximum quantity of overlapping physical downlink shared channels or physical uplink shared channels that is supported by the terminal on one time domain resource segment, where the time domain resource segment includes one or more time domain resource units.

The network device indicates a maximum quantity of overlapping PDSCHs or PUSCHs on one resource segment to the terminal, to properly schedule the terminal to perform multi-DCI based transmission.

According to a fifth aspect, a multi-downlink control information based transmission method is provided. The method is performed by a terminal, and includes:

The terminal reports second capability reporting information to a network device, where the second capability reporting information indicates whether the terminal shares a carrier aggregation or dual connectivity processing capability.

The terminal performs transmission based on resource scheduling of the network device.

According to a sixth aspect, a multi-downlink control information based transmission method is provided. The method is performed by a network device, and includes:

The network device receives second capability reporting information reported by a terminal, where the second capability reporting information indicates whether the terminal shares a carrier aggregation or dual connectivity processing capability.

The network device schedules, based on the second capability reporting information reported by the terminal, the terminal to perform transmission.

In a possible implementation of the fifth aspect or the sixth aspect, the shared processing capability includes a shared quantity of blind detections or a shared quantity of control information elements (CCE).

In another possible implementation of the fifth aspect or the sixth aspect, the second capability reporting information reported by the terminal to the network device is further used to indicate a maximum quantity of frequency domain resource units for multi-downlink control information based transmission that is supported by the terminal.

In another possible implementation of the fifth aspect or the sixth aspect, the second capability reporting information reported by the terminal to the network device is further used to indicate a maximum quantity of frequency domain resource units for multi-downlink control information based transmission that is supported by the terminal and a type of multi-downlink control information based transmission that is supported by the terminal.

The multi-downlink control information based transmission methods provided in the fifth aspect and the sixth aspect are implemented, where the terminal reports whether the terminal shares a supported carrier aggregation/dual connectivity (CA/DC) based transmission processing capability and multi-DCI based transmission processing capability and after learning of the capability reported by the terminal, the network device schedules the terminal to perform multi-DCI based transmission in a CA/DC based transmission scenario.

According to a seventh aspect, a multi-downlink control information based transmission method is provided. The method is performed by a terminal, and includes:

The terminal reports third capability reporting information to a network device, where the third capability reporting information indicates a quantity of timing advances (TA), a quantity of fast Fourier transformation windows (FFT windows), or a quantity of baseband processing processes that is supported by the terminal.

The terminal performs transmission based on resource scheduling of the network device.

According to an eighth aspect, a multi-downlink control information based transmission method is provided. The method is performed by a network device, and includes:

The network device receives third capability reporting information reported by a terminal, where the third capability reporting information indicates a quantity of TAs, a quantity of fast Fourier transformation windows FFT windows, or a quantity of baseband processing processes that is supported by the terminal.

The network device schedules, based on the third capability reporting information, the terminal to perform transmission.

In a possible implementation of the seventh aspect or the eighth aspect, the third capability reporting information indicates a quantity of TAs, a quantity of FFT windows, or a quantity of baseband processing processes that is supported by the terminal on one frequency domain resource unit.

In another possible implementation of the seventh aspect or the eighth aspect, the third capability reporting information indicates a quantity of TAs, a quantity of FFT windows, or a quantity of baseband processing processes that is supported by the terminal on each frequency domain resource unit.

The multi-downlink control information based transmission methods provided in the seventh aspect and the eighth aspect are implemented, where the terminal reports the quantity of TAs, the quantity of FFT windows, or the quantity of baseband processing processes that is supported by the terminal, and after learning of a capability reported by the terminal, the network device schedules, in a range supported by the terminal, the terminal to perform transmission.

According to a ninth aspect, a multi-downlink control information based transmission method is provided. The method is performed by a terminal, and includes:

The terminal reports fourth capability reporting information to a network device, where the fourth capability reporting information indicates whether the terminal supports partial overlap between a plurality of physical uplink shared channels, or whether the terminal supports partial overlap between a plurality of physical downlink shared channels.

The terminal performs transmission based on resource scheduling of the network device.

According to a tenth aspect, a multi-downlink control information based transmission method is provided. The method is performed by a network device, and includes:

The network device receives fourth capability reporting information reported by a terminal, where the fourth capability reporting information indicates whether the terminal supports partial overlap between a plurality of physical uplink shared channels, or whether the terminal supports partial overlap between a plurality of physical downlink shared channels.

The network device schedules, based on the fourth capability reporting information, the terminal to perform transmission.

In a possible implementation of the ninth aspect or the tenth aspect, the fourth capability reporting information indicates, on one frequency domain resource unit, whether the terminal supports partial overlap between a plurality of physical uplink shared channels, or whether the terminal supports partial overlap between a plurality of physical downlink shared channels.

In another possible implementation of the ninth aspect or the tenth aspect, the fourth capability reporting information indicates, on each frequency domain resource unit, whether the terminal supports partial overlap between a plurality of physical uplink shared channels, or whether the terminal supports partial overlap between a plurality of physical downlink shared channels.

In another possible implementation of the ninth aspect or the tenth aspect, the fourth capability reporting information indicates a quantity of partially overlapping physical uplink shared channels or a quantity of partially overlapping physical downlink shared channels that is supported by the terminal.

The multi-downlink control information based transmission methods provided in the ninth aspect and the tenth aspect are implemented, where the terminal reports whether the terminal supports partial overlap between resources of PDSCHs/PUSCHs, and after learning of a capability reported by the terminal, the network device can schedule, only when the terminal supports the partial overlap, the terminal to perform transmission for the partial overlap.

According to an eleventh aspect, a multi-downlink control information based transmission method is provided. The method is performed by a terminal, and includes:

The terminal reports fifth capability reporting information to a network device, where the fifth capability reporting information indicates whether the terminal supports a delay between a plurality of physical uplink shared channels exceeding predetermined duration, or whether the terminal supports a delay between a plurality of physical downlink shared channels exceeding predetermined duration.

The terminal performs transmission based on resource scheduling of the network device.

According to a twelfth aspect, a multi-downlink control information based transmission method is provided. The method is performed by a network device, and includes:

The network device receives fifth capability reporting information reported by a terminal, where the fifth capability reporting information indicates whether the terminal supports a delay between a plurality of physical uplink shared channels exceeding predetermined duration, or whether the terminal supports a delay between a plurality of physical downlink shared channels exceeding predetermined duration.

The network device schedules, based on the fifth capability reporting information, the terminal to perform transmission.

In a possible implementation of the eleventh aspect or the twelfth aspect, the fifth capability reporting information indicates, on one frequency domain resource unit, whether the terminal supports a delay between a plurality of physical uplink shared channels exceeding the predetermined duration, or whether the terminal supports a delay between a plurality of physical downlink shared channels exceeding the predetermined duration.

In another possible implementation of the eleventh aspect or the twelfth aspect, the fifth capability reporting information indicates, on each frequency domain resource unit, whether the terminal supports a delay between a plurality of physical uplink shared channels exceeding the predetermined duration, or whether the terminal supports a delay between a plurality of physical downlink shared channels exceeding the predetermined duration.

In another possible implementation of the eleventh aspect or the twelfth aspect, the fifth capability reporting information indicates a quantity of physical uplink shared channels with a delay therebetween exceeding the predetermined duration or a quantity of physical downlink shared channels with a delay therebetween exceeding the predetermined duration, where the quantity is supported by the terminal.

In another possible implementation of the eleventh aspect or the twelfth aspect, the predetermined duration is a cyclic prefix (CP).

The multi-downlink control information based transmission methods provided in the eleventh aspect and the twelfth aspect are implemented, where the terminal reports whether the terminal supports a delay between PDSCHs/PUSCHs exceeding the CP, and a supported quantity of PDSCHs/PUSCHs with a delay therebetween exceeding the CP on one frequency domain resource unit, to properly schedule the terminal to perform transmission.

According to a thirteenth aspect, a multi-downlink control information based transmission method is provided. The method is performed by a terminal, and includes:

The terminal reports sixth capability reporting information to a network device, where the sixth capability reporting information indicates a time or frequency synchronization range between downlink transmission resources that is supported by the terminal or indicates a time or frequency synchronization range between uplink transmission resources that is supported by the terminal.

The terminal performs transmission based on resource scheduling of the network device.

According to a fourteenth aspect, a multi-downlink control information based transmission method is provided. The method is performed by a network device, and includes:

The network device receives sixth capability reporting information reported by a terminal, where the sixth capability reporting information indicates a time or frequency synchronization range between downlink transmission resources that is supported by the terminal or indicates a time or frequency synchronization range between uplink transmission resources that is supported by the terminal.

The network device schedules, based on the sixth capability reporting information, the terminal to perform transmission.

The multi-downlink control information based transmission method provided in the thirteenth aspect or the fourteenth aspect is implemented, where the terminal reports the time or frequency synchronization range between the downlink transmission resources that is supported by the terminal, to properly schedule the terminal to perform transmission.

According to a fifteenth aspect, a multi-downlink control information based transmission method is provided. The method is performed by a terminal, and includes:

The terminal reports seventh capability reporting information to a network device, where the seventh capability reporting information indicates a minimum time interval, supported by the terminal, between a plurality of PDCCHs corresponding to a plurality of scheduled PDSCHs/PUSCHs in a same time domain resource unit, or a minimum time interval, supported by the terminal, between a plurality of PDCCHs corresponding to a plurality of scheduled overlapping PDSCHs/PUSCHs in a same time domain resource unit.

The terminal performs transmission based on resource scheduling of the network device.

According to a sixteenth aspect, a multi-downlink control information based transmission method is provided. The method is performed by a network device, and includes:

The network device receives seventh capability reporting information reported by a terminal, where the seventh capability reporting information indicates a minimum time interval, supported by the terminal, between a plurality of PDCCHs corresponding to a plurality of scheduled PDSCHs/PUSCHs in a same time domain resource unit, or a minimum time interval, supported by the terminal, between a plurality of PDCCHs corresponding to a plurality of scheduled overlapping PDSCHs/PUSCHs in a same time domain resource unit.

The network device schedules, based on the seventh capability reporting information, the terminal to perform transmission.

The multi-downlink control information based transmission method provided in the fifteenth aspect or the sixteenth aspect is implemented, where the terminal reports a minimum time interval between a plurality of PDCCHs corresponding to a plurality of scheduled overlapping or non-overlapping PDSCHs/PUSCHs in a same time domain resource unit or a same time unit, to properly schedule the terminal to perform transmission.

According to a seventeenth aspect, a multi-downlink control information based transmission method is provided. The method is performed by a terminal, and includes:

The terminal reports eighth capability reporting information to a network device, where the eighth capability reporting information indicates a maximum time interval, supported by the terminal, between a plurality of PDCCHs corresponding to a plurality of scheduled PDSCHs/PUSCHs in a same time domain resource unit, or a maximum time interval, supported by the terminal, between a plurality of PDCCHs corresponding to a plurality of scheduled overlapping PDSCHs/PUSCHs in a same time domain resource unit.

The terminal performs transmission based on resource scheduling of the network device.

According to an eighteenth aspect, a multi-downlink control information based transmission method is provided. The method is performed by a network device, and includes:

The network device receives eighth capability reporting information reported by a terminal, where the eighth capability reporting information indicates a maximum time interval, supported by the terminal, between a plurality of PDCCHs corresponding to a plurality of scheduled PDSCHs/PUSCHs in a same time domain resource unit, or a maximum time interval, supported by the terminal, between a plurality of PDCCHs corresponding to a plurality of scheduled overlapping PDSCHs/PUSCHs in a same time domain resource unit.

The network device schedules, based on the eighth capability reporting information, the terminal to perform transmission.

The multi-downlink control information based transmission method provided in the seventeenth aspect or the eighteenth aspect is implemented, where the terminal reports a maximum interval time between a plurality of PDCCHs corresponding to a plurality of scheduled overlapping or non-overlapping PDSCHs/PUSCHs in a same time domain resource unit or a same time unit, to properly schedule the terminal to perform transmission.

According to a nineteenth aspect, a multi-downlink control information based transmission method is provided. The method is performed by a terminal, and includes:

The terminal reports ninth capability reporting information to a network device, where the ninth capability reporting information indicates whether the terminal supports joint PDCCH detection.

The terminal performs transmission based on resource scheduling of the network device.

According to a twentieth aspect, a multi-downlink control information based transmission method is provided. The method is performed by a network device, and includes:

The network device receives ninth capability reporting information reported by a terminal, where the ninth capability reporting information indicates whether the terminal supports joint PDCCH detection.

The network device schedules, based on the ninth capability reporting information, the terminal to perform transmission.

The multi-downlink control information based transmission method provided in the nineteenth aspect or the twentieth aspect is implemented, where the terminal reports whether the terminal supports joint PDCCH detection, and after the network device learns of a capability of the terminal, joint PDCCH detection is properly performed.

According to a twenty-first aspect, a multi-downlink control information based transmission method is provided. The method is performed by a terminal, and includes:

The terminal reports tenth capability reporting information to a network device, where the tenth capability reporting information indicates whether the terminal supports joint detection of a plurality of PDSCHs/PUSCHs or joint detection of a plurality of overlapping PDSCHs/PUSCHs.

The terminal performs transmission based on resource scheduling of the network device.

According to a twenty-second aspect, a multi-downlink control information based transmission method is provided. The method is performed by a network device, and includes:

The network device receives tenth capability reporting information reported by a terminal, where the tenth capability reporting information indicates whether the terminal supports joint detection of a plurality of PDSCHs/PUSCHs or joint detection of a plurality of overlapping PDSCHs/PUSCHs.

The network device schedules, based on the tenth capability reporting information, the terminal to perform transmission.

The multi-downlink control information based transmission method provided in the twenty-first aspect or the twenty-second aspect is implemented, where the terminal reports whether the terminal supports joint detection of the plurality of PDSCHs or joint detection of the plurality of overlapping PDSCHs, and after the network device learns of a capability of the terminal, joint PDSCH detection is properly performed. During implementation, the multi-downlink control information based transmission methods provided in the first aspect, the third aspect, the fifth aspect, the seventh aspect, the ninth aspect, the eleventh aspect, the thirteenth aspect, the fifteenth aspect, the seventeenth aspect, the nineteenth aspect, and the twenty-first aspect may be combined with each other.

During implementation, the multi-downlink control information based transmission method provided in at least one of the second aspect, the fourth aspect, the sixth aspect, the eighth aspect, the tenth aspect, the twelfth aspect, the fourteenth aspect, the sixteenth aspect, the eighteenth aspect, the twentieth aspect, or the twenty-second aspect may be combined with each other.

According to a twenty-third aspect, a terminal is provided. The terminal includes:
a transceiver module, configured to report first capability reporting information to a network device, where the first capability reporting information indicates at least one of information indicating whether the terminal supports multi-downlink control information based transmission, a supported type of multi-downlink control information based transmission, or a supported quantity of multi-downlink control information based transmissions; and
a processing module, configured to perform transmission based on resource scheduling of the network device.

In a possible implementation, the processing module is a processor, and the transceiver module is a transceiver.

The terminal provided in the twenty-third aspect performs the multi-downlink control information based transmission method provided in at least one of the first aspect, the third aspect, the fifth aspect, the seventh aspect, the ninth aspect, the eleventh aspect, the thirteenth aspect, the fifteenth aspect, the seventeenth aspect, the nineteenth aspect, or the twenty-first aspect.

According to a twenty-fourth aspect, a network device is provided. The network device includes:
a transceiver module, configured to receive first indication information delivered by a network device, where the first indication information indicates at least one of types or a quantity of multi-downlink control information based transmissions that are supported by the terminal; and
a processing module, configured to perform transmission based on resource scheduling of the network device and at least one of the types or the quantity of multi-downlink control information based transmissions.

In a possible implementation, the processing module is a processor, and the transceiver module is a transceiver.

The network device provided in the twenty-fourth aspect performs the multi-downlink control information based transmission method provided in at least one of the second aspect, the fourth aspect, the sixth aspect, the eighth aspect, the tenth aspect, the twelfth aspect, the fourteenth aspect, the sixteenth aspect, the eighteenth aspect, the twentieth aspect, or the twenty-second aspect.

According to a twenty-fifth aspect, a multiple transmission reception point transmission system is provided. The transmission system includes the terminal according to the twenty-first aspect and the network device according to the twenty-second aspect.

According to a twenty-sixth aspect, a processing apparatus is provided. The processing apparatus includes at least one circuit.

In a possible implementation, the at least one circuit is configured to perform the multi-downlink control information based transmission method provided in at least one of the first aspect, the third aspect, the fifth aspect, the seventh aspect, the ninth aspect, the eleventh aspect, the thirteenth aspect, the fifteenth aspect, the seventeenth aspect, the nineteenth aspect, or the twenty-first aspect. The processing apparatus may be a processor, and the processor is configured to perform the multi-downlink control information based transmission method provided in at least one of the first aspect, the third aspect, the fifth aspect, the seventh aspect, the ninth aspect, the eleventh aspect, the thirteenth aspect, the fifteenth aspect, the seventeenth aspect, the nineteenth aspect, or the twenty-first aspect. Operations related to transmitting and receiving should be understood as operations performed by the processor by using a transceiver.

In another possible implementation, the at least one circuit is configured to perform the multi-downlink control information based transmission method provided in at least one of the second aspect, the fourth aspect, the sixth aspect, the eighth aspect, the tenth aspect, the twelfth aspect, the fourteenth aspect, the sixteenth aspect, the eighteenth aspect, the twentieth aspect, or the twenty-second aspect. The processing apparatus may be a processor, and the processor is configured to perform the multi-downlink control information based transmission method provided in at least one of the second aspect, the fourth aspect, the sixth aspect, the eighth aspect, the tenth aspect, the twelfth aspect, the fourteenth aspect, the sixteenth aspect, the eighteenth aspect, the twentieth aspect, or the twenty-second aspect. Operations related to transmitting and receiving should be understood as operations performed by the processor by using a transceiver.

According to a twenty-seventh aspect, a communications device is provided. The communications device may be a network device or a terminal, and the communications device includes a memory; and a processor, configured to read instructions stored in the memory.

When the communications device is the terminal, the processor reads the instructions stored in the memory, to perform the multi-downlink control information based transmission method provided in at least one of the first aspect, the third aspect, the fifth aspect, the seventh aspect, the ninth aspect, the eleventh aspect, the thirteenth aspect, the fifteenth aspect, the seventeenth aspect, the nineteenth aspect, or the twenty-first aspect. Operations related to transmitting and receiving should be understood as operations performed by the processor by using a transceiver.

When the communications device is the network device, the processor reads the instructions stored in the memory, to perform the multi-downlink control information based transmission method provided in at least one of the second aspect, the fourth aspect, the sixth aspect, the eighth aspect, the tenth aspect, the twelfth aspect, the fourteenth aspect, the sixteenth aspect, the eighteenth aspect, the twentieth aspect, or the twenty-second aspect. Operations related to transmitting and receiving should be understood as operations performed by the processor by using a transceiver.

The memory may be, for example, a read-only memory (ROM). The memory and the processor may be integrated on a same chip, or may be separately disposed on different chips. A type of the memory and a manner of disposing the memory and the processor are not limited in this application.

According to a twenty-eighth aspect, a computer-readable storage medium is provided. The computer-readable storage medium stores instructions. When the instructions are run on a processing component of a computer, the processing component is enabled to perform the multi-downlink control information based transmission method provided in at least one of the first aspect, the third aspect, the fifth aspect, the seventh aspect, the ninth aspect, the eleventh aspect, the thirteenth aspect, the fifteenth aspect, the seventeenth aspect, the nineteenth aspect, or the twenty-first aspect. The computer-readable storage medium is a non-transitory storage medium.

According to a twenty-ninth aspect, a computer-readable storage medium is provided. The computer-readable storage medium stores instructions. When the instructions are run on a processing component of a computer, the processing component is enabled to perform the multi-downlink control information based transmission method provided in at least one of the second aspect, the fourth aspect, the sixth aspect, the eighth aspect, the tenth aspect, the twelfth aspect, the fourteenth aspect, the sixteenth aspect, the eighteenth aspect, the twentieth aspect, or the twenty-second aspect. The computer-readable storage medium is a non-transitory storage medium.

According to a thirtieth aspect, a chip is provided. The chip includes a programmable logic circuit and/or program instructions. When the chip runs, the chip is configured to implement the multi-downlink control information based transmission method provided in at least one of the first aspect, the third aspect, the fifth aspect, the seventh aspect, the ninth aspect, the eleventh aspect, the thirteenth aspect, the fifteenth aspect, the seventeenth aspect, the nineteenth aspect, or the twenty-first aspect.

According to a thirty-first aspect, a chip is provided. The chip includes a programmable logic circuit and/or program instructions. When the chip runs, the chip is configured to implement the multi-downlink control information based transmission method provided in at least one of the second aspect, the fourth aspect, the sixth aspect, the eighth aspect, the tenth aspect, the twelfth aspect, the fourteenth aspect, the sixteenth aspect, the eighteenth aspect, the twentieth aspect, or the twenty-second aspect.

According to a thirty-second aspect, a computer program product including instructions is provided. When the computer program product runs on a processing component of a computer, the processing component is enabled to perform the multi-downlink control information based transmission method provided in at least one of the first aspect, the third aspect, the fifth aspect, the seventh aspect, the ninth aspect, the eleventh aspect, the thirteenth aspect, the fifteenth aspect, the seventeenth aspect, the nineteenth aspect, or the twenty-first aspect.

According to a thirty-third aspect, a computer program product including instructions is provided. When the computer program product runs on a processing component of a computer, the processing component is enabled to perform the multi-downlink control information based transmission method provided in at least one of the second aspect, the fourth aspect, the sixth aspect, the eighth aspect, the tenth aspect, the twelfth aspect, the fourteenth aspect, the sixteenth aspect, the eighteenth aspect, the twentieth aspect, or the twenty-second aspect.

Beneficial effects achieved by the technical solutions provided in this application are as follows: The terminal reports a capability of the terminal to support multi-DCI based transmission, or receives indication information of the capability of the terminal to support multi-DCI based transmission that is delivered by the network device, so that the network device can properly schedule the terminal, thereby reducing processing complexity of the terminal.

DESCRIPTION OF EMBODIMENTS

Embodiments of this application provide a technical solution, in which a terminal reports information about a capability of the terminal to support multi-DCI based transmission, or the terminal receives indication information that is delivered by a network device and that is of types or a quantity of multi-DCI based transmissions that is supported by the terminal, thereby helping properly schedule the terminal, and reduce processing complexity of the terminal. The technical solution provided in the embodiments of this application is described in detail below with reference to the accompanying drawings and the embodiments.

Figure 1:
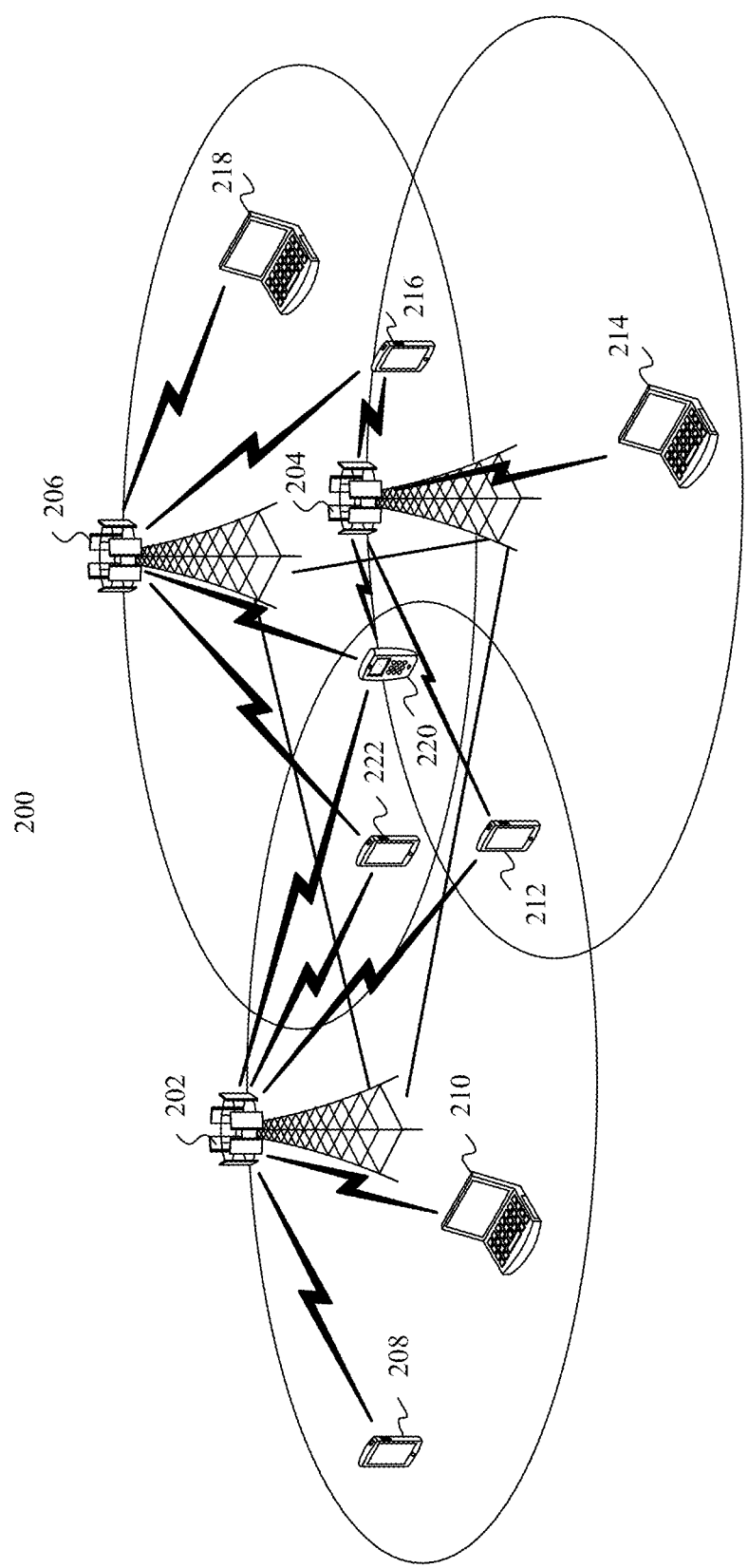
FIG. 1 is a schematic diagram of an implementation environment according to an embodiment of this application.

FIG. 1 is a schematic diagram of an implementation environment according to the embodiments of this application. The implementation environment provides a wireless communications network 200. The wireless communications network 200 may include a plurality of base stations and a plurality of terminal devices. As shown in FIG. 1, the plurality of base stations include base stations 202 to 206, and the plurality of terminal devices include terminal devices 208 to 222. Any two of the base stations 202 to 206 may perform communication through a backhaul link (as indicated by straight lines between the base stations 202 to 206). Any one of the terminal devices 208 to 222 may perform communication with a corresponding base station through a wireless link (as indicated by broken lines between the base stations 202 to 206 and the terminal devices 208 to 222).

Depending on a used wireless communications technology, any one of the base stations 202 to 206 may also be referred to as a NodeB, an evolved NodeB (eNodeB), an access point (AP), or the like. In addition, based on sizes of service coverage areas provided by the base stations, the base stations may be further classified into a macro base station for providing a macro cell, a micro base station for providing a micro cell, a femto base station for providing a femto cell, and the like. With continuous evolution of the wireless communications technology, another name may also be used for a future base station.

Any one of the terminal devices 208 to 222 may be any wireless communications device having a wireless communication function, for example, but not limited to a mobile cellular phone, a cordless phone, a session initiation protocol (SIP) phone, a personal digital assistant (PDA), a smartphone, a notebook computer, a tablet computer, a wireless data card, a wireless modem (Modem), a wearable device (such as a smartwatch), or a vehicle-mounted device. As an internet of things (IoT) technology emerges, a growing quantity of devices that previously do not have a communication function, for example, but not limited to, a household appliance, a transportation vehicle, a tool device, a service device, and a service facility, are configured with a wireless communications unit to obtain the wireless communication function. In this way, these devices can access a wireless communications network and accept remote control. This type of device has the wireless communication function because of being configured with the wireless communications unit. Therefore, this type of device is also a type of wireless communications device. In addition, the terminal devices 208 to 222 may alternatively be mobile stations, mobile devices, mobile terminals, wireless terminals, handheld devices, clients, or the like.

The base stations 202 to 206 are usually used as access devices, the terminal devices 208 to 222 are usually used as user equipments, and the base stations 202 to 206 may provide a radio access service for the terminal devices 208 to 222. Each base station corresponds to one service coverage area (which may be referred to as a cellular, as shown in an oval area in FIG. 1), and a terminal device that has entered the service coverage area may communicate with the base station by using a radio signal, to accept the radio access service provided by the base station.

Service coverage areas of different base stations may overlap, and a terminal device in the overlapping area may receive radio signals from a plurality of base stations. Therefore, base stations with the overlapping service coverage areas may coordinate with each other to serve the terminal device in the overlapping area. For example, a plurality of base stations may serve the terminal device in the overlapping area by using a coordinated multipoint (CoMP) technology or a multi-transmission reception point (Multi-TRP) transmission technology.

For example, as shown in FIG. 1, a service coverage area of the base station 202 overlaps a service coverage area of the base station 206, and the terminal device 222 is in the overlapping area. Therefore, the terminal device 222 may receive radio signals from the base station 202 and the base station 206, and the base station 202 and the base station 206 may coordinate with each other, to serve the terminal device 222. For another example, as shown in FIG. 1, there is a common overlapping area among service coverage areas of the base station 202, the base station 204, and the base station 206, and the terminal device 220 is in the overlapping area. Therefore, the terminal device 220 may receive radio signals from the base station 202, the base station 204, and the base station 206, and the base station 202, the base station 204, and the base station 206 may coordinate with each other, to serve the terminal device 220.

Figure 2:
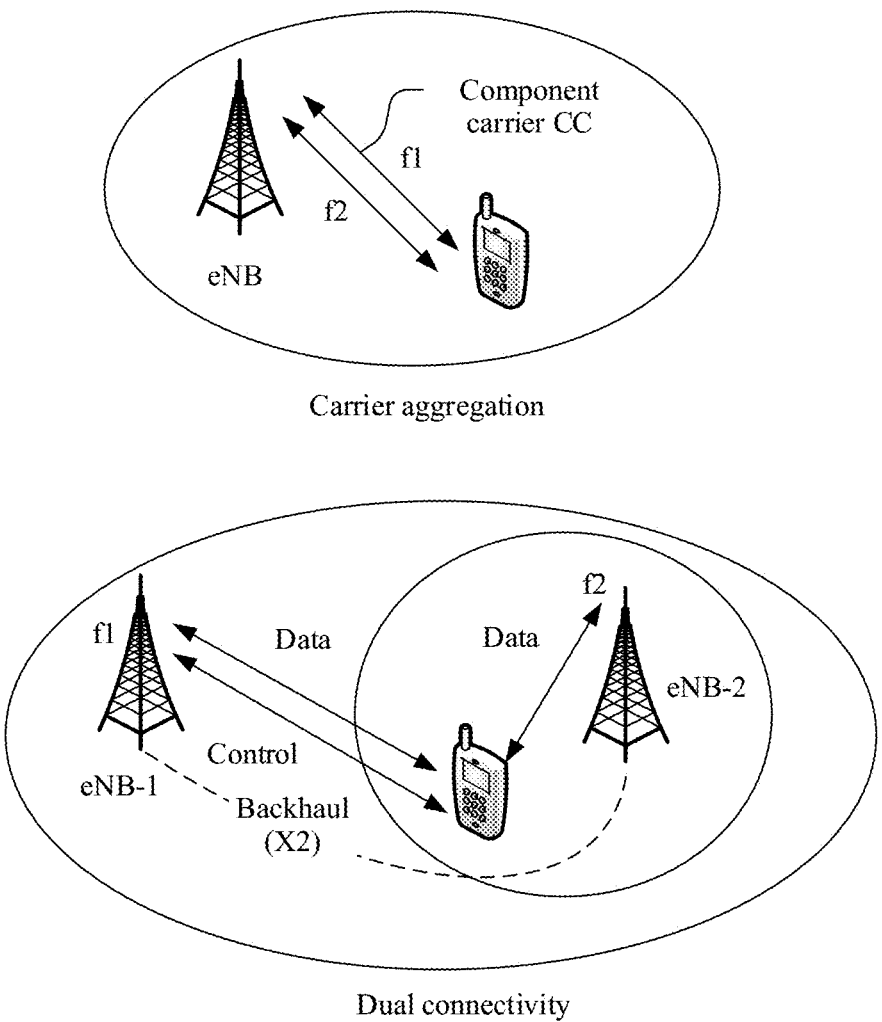
FIG. 2 is a schematic diagram of transmission in a CA/DC scenario according to an embodiment of this application

Referring to FIG. 2, to provide a higher service rate, the 3rd generation partnership project (3GPP) introduces carrier aggregation (CA), in which a plurality of consecutive or non-consecutive carriers (CC) are aggregated to a higher bandwidth (a maximum of 100 MHz) to meet a rate requirement.

Dual connectivity (DC) supports traffic distribution and transmission between two base stations connected through an X2 interface, and carrier aggregation is performed within each base station, to aggregate a plurality of consecutive or non-consecutive carriers into a higher bandwidth.

In a CA/DC scenario, a terminal needs to support more than two CCs and needs to process corresponding DCI from the more than two CCs. CA/DC may be considered as a scenario of a multi-downlink control information based transmission solution.

In this application, a plurality of antennas may be configured for each of the base stations 202 to 206 and the terminal devices 208 to 222, to support a MIMO technology. It should be understood that the technical solutions in this application are applicable to various possible transmit diversity solutions.

In addition, the base stations 202 to 206 and the terminal devices 208 to 222 may perform communication by using various wireless communications technologies. Unless otherwise specified, the technical solutions provided in the embodiments of this application may be applied to various wireless communications technologies and wireless communications systems. In addition, the terms "system" and "network" may be interchanged.

Figure 3:
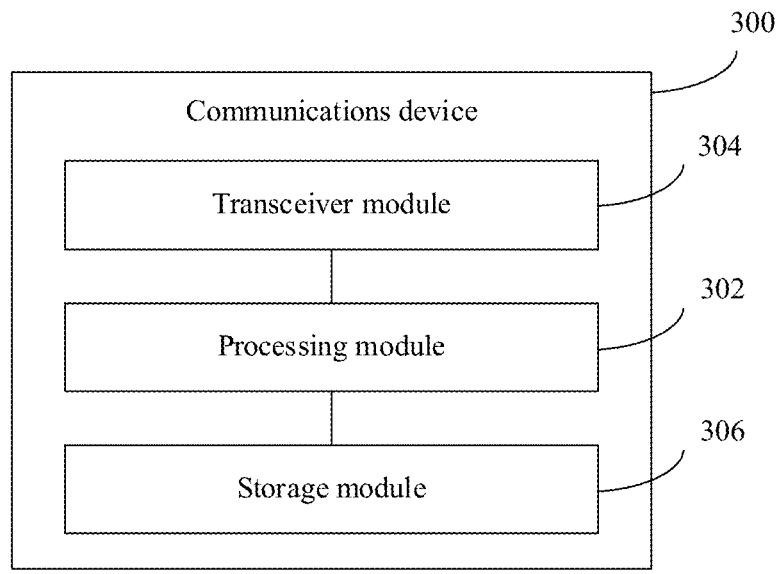
FIG. 3 is a schematic diagram of a logical structure of a communications device according to an embodiment of this application.

FIG. 3 is a schematic diagram of a logical structure of a communications device 300 according to an embodiment of this application. The communications device 300 may be a network device (for example, any base station in the implementation environment shown in FIG. 1), or may be a terminal (for example, any terminal device in the implementation environment shown in FIG. 1). Referring to FIG. 2, the communications device 300 may include a processing module 302 and a transceiver module 304, and optionally further include a storage module 306. Functions of these modules are described in detail below. In a specific implementation process, the processing module 302 may be implemented by a processor 402 in a communications device 400 to be described below, or may be implemented by the processor 402 and a memory 408 in the communications device 400. Certainly, another implementation may be used. The transceiver module 304 may be implemented by a transceiver 404 in the communications device 400, and the storage module 306 may be implemented by the memory 408 in the communications device 400. Certainly, another implementation may be used.

Figure 4:
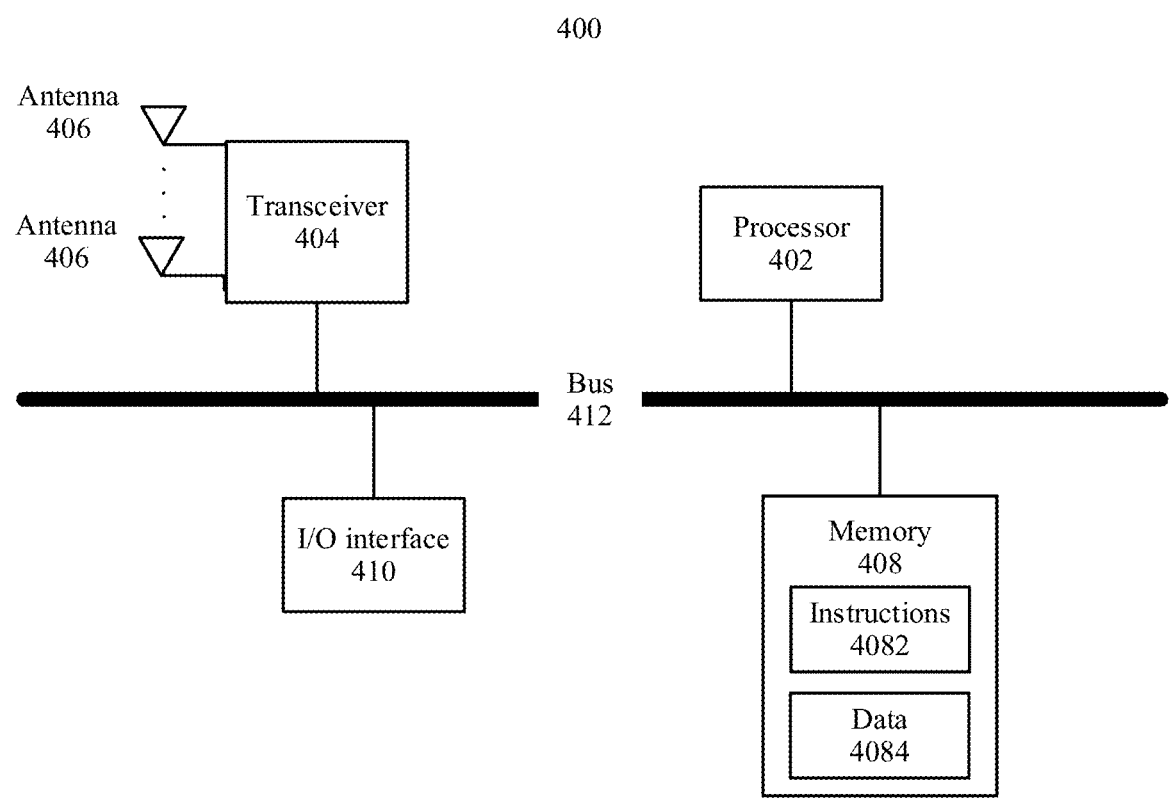
FIG. 4 is a schematic diagram of a hardware structure of a communications device according to an embodiment of this application.

FIG. 4 is a schematic diagram of a hardware structure of the communications device 400 according to an embodiment of this application. The communications device 400 may be a network device (for example, any base station in the implementation environment shown in FIG. 1), or may be a terminal (for example, any terminal device in the implementation environment shown in FIG. 1). Referring to FIG. 4, the communications device 400 includes the processor 402, the transceiver 404, a plurality of antennas 406, the memory 408, an input/output (I/O) interface 410, and a bus 412. The memory 408 may be configured to store an instruction 4082 and data 4084. In addition, the processor 402, the transceiver 404, the memory 408, and the I/O interface 410 are in communication connection with each other by using the bus 412. The plurality of antennas 406 are connected to the transceiver 404. It should be noted that, a manner shown in FIG. 4 in which the processor 402, the transceiver 404, the memory 408, and the I/O interface 410 are connected is merely an example. In a specific implementation process, the processor 402, the transceiver 404, the memory 408, and the I/O interface 410 may alternatively be in communication connection with each other in another connection manner without using the bus 412.

The processor 402 may be a general-purpose processor. The general-purpose processor may be a processor that performs a particular operation or operation by reading and executing an instruction (for example, the instruction 4082) stored in a memory (for example, the memory 408). In a process in which the general-purpose processor performs the foregoing operation or operation, data (for example, the data 4084) stored in the memory (for example, the memory 408) may be used. The general-purpose processor may be but is not limited to a central processing unit (CPU). In addition, the processor 402 may alternatively be a dedicated processor. The dedicated processor may be a processor specially designed to perform a specific operation and/or operation. The dedicated processor may be, for example, but not limited to, a digital signal processor (DSP), an application-specific integrated circuit (, ASIC), and a field programmable gate array (FPGA). In addition, the processor 402 may alternatively be a combination of a plurality of processors, for example, a multi-core processor. The processor 402 may include at least one circuit, to perform operations of a multi-downlink control information based transmission method in the following embodiments.

The transceiver 404 is configured to receive and send a signal. Optionally, the transceiver 404 receives and sends a signal through at least one of the plurality of antennas 406.

The memory 408 may be any type of storage medium, for example, a random access memory (RAM), a ROM, a non-volatile RAM (NVRAM), a programmable ROM (PROM), an erasable PROM (EPROM), an electrically erasable PROM (EEPROM), a flash memory, an optical memory, and a register. The memory 408 is configured to store the instruction 4082 and the data 4084. When the processor 402 is a general-purpose processor, the processor 402 may perform a particular operation or operation by reading and executing the instruction 4082 stored in the memory 408. In a process in which the foregoing operation or operation is performed, the data 4084 may need to be used.

The I/O interface 410 is configured to: receive an instruction or data from a peripheral device, and output an instruction or data to the peripheral device.

In a specific implementation process, the processor 402 may be configured to perform, for example, but not limited to, baseband-related processing; and the transceiver 404 may be configured to perform, for example, but not limited to, radio frequency receiving and sending.

The foregoing components may be separately disposed on chips independent of each other, or at least some or all of the components may be disposed on a same chip. For example, the processor 402 may be further classified into an analog baseband processor and a digital baseband processor. The analog baseband processor and the transceiver 404 may be integrated on a same chip, and the digital baseband processor may be disposed on an independent chip.

With continuous development of integrated circuit technologies, more components can be integrated on a same chip. For example, the digital baseband processor and a plurality of application processors (for example, but not limited to, a graphics processor and a multimedia processor) may be integrated on a same chip. Such a chip may be referred to as a system on chip. Whether the components are independently disposed on different chips or are integrated and disposed on one or more chips usually depends on specific requirements of a product design. A specific implementation form of the foregoing components is not limited in the embodiments of this application.

It should be noted that, the communications device 400 shown in FIG. 4 is merely an example. In a specific implementation process, the communications device 400 may further include other hardware components, which are not enumerated one by one in this specification. Specific functions of the hardware components in the communications device 400 are described in detail below.

One or more of the foregoing modules or units may be implemented by software, hardware, or a combination thereof. When any one of the foregoing modules or units is implemented by software, the software exists in a form of computer program instructions that are stored in a memory. The processor may be configured to execute the program instructions to implement the foregoing method procedures. The processor may include but is not limited to at least one of the following various computing devices that run software: a central processing unit (CPU), a microprocessor, a digital signal processor (DSP), a microcontroller unit (MCU), an artificial intelligence processor, or the like. Each computing device may include one or more cores configured to perform an operation or processing by executing software instructions. The processor may be embedded in an SoC (system-on-a-chip) or an application-specific integrated circuit (ASIC), or may be an independent semiconductor chip. In addition to a core configured to perform an operation or processing by executing the software instructions, the processor may further include a necessary hardware accelerator, for example, a field programmable gate array (FPGA), a PLD (programmable logic device), or a logic circuit that implements a dedicated logical operation.

When the foregoing modules or units are implemented by hardware, the hardware may be any one or any combination of a CPU, a microprocessor, a DSP, an MCU, an artificial intelligence processor, an ASIC, an SoC, an FPGA, a PLD, a dedicated digital circuit, a hardware accelerator, or a non-integrated discrete device, and the hardware may run necessary software or does not depend on software to perform the foregoing method procedures.

To resolve a problem that processing complexity of a terminal is relatively high in an existing multi-DCI based multi-TRP transmission solution, a capability of the terminal to support multi-DCI based transmission needs to be restricted in this application. In an implementation, the terminal reports the capability of the terminal to support multi-DCI based transmission. In another implementation, the capability of the terminal to support multi-DCI based transmission is restricted by a protocol, and a network device sends indication information or indicates the capability to the terminal.

Before the embodiments of this application are described, concepts of some terms are first described to better understand the embodiments of this application.

1. Frequency Domain Resource Unit and One Frequency Domain Resource Segment

One frequency domain resource unit may be one resource block (RB), one resource block group (RBG), one predefined subband (subband), one band, one bandwidth part (BWP), or one component carrier (CC).

One frequency domain resource segment includes one or more frequency domain resource units, or consists of one or more frequency domain resource units. For example, one frequency domain resource unit is one resource block, and one resource block group may also be considered as one frequency domain resource segment in this case. For another example, one frequency domain resource unit is one subband, and one frequency domain resource segment may be a band including several consecutive or non-consecutive subbands. One frequency domain resource unit is one band, and one frequency domain resource segment may also be one band, or a larger band including several bands. For another example, one frequency domain resource segment is one CC, including a BWP. Alternatively, one frequency domain resource segment is one BWP, including a plurality of subbands.

Figure 5:
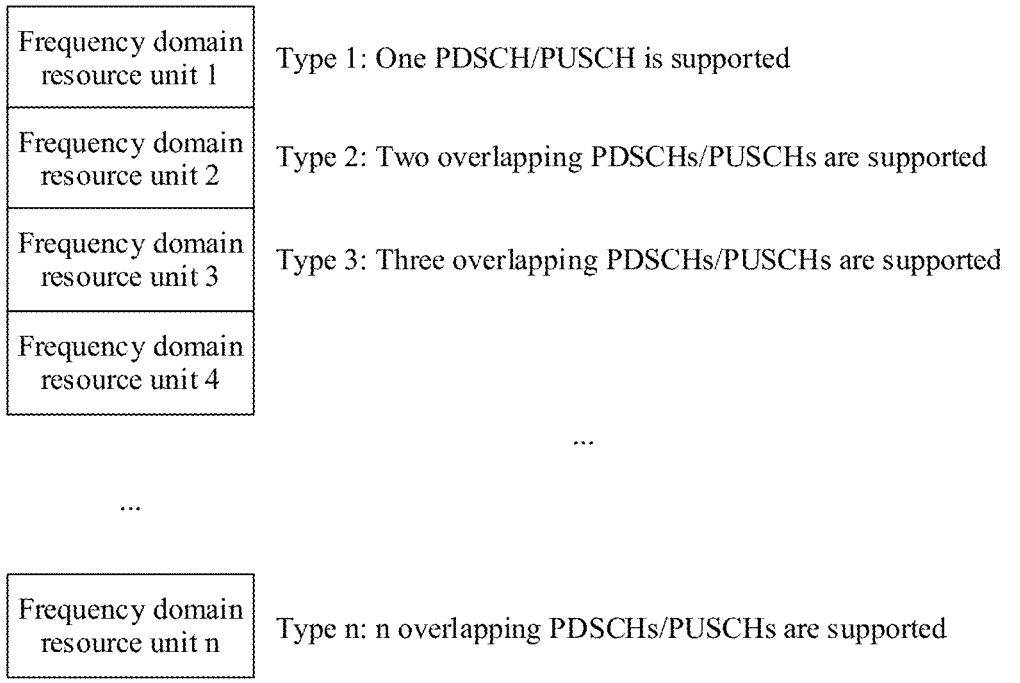
FIG. 5 is a schematic diagram of a frequency domain resource and a frequency domain resource unit according to an embodiment of this application.

FIG. 5 is used as an example. FIG. 5 shows n frequency domain resource units, such as a frequency domain resource unit 1, a frequency domain resource unit 2, a frequency domain resource unit 3, a frequency domain resource unit 4, . . . , and a frequency domain resource unit n.

One frequency domain resource segment may be a frequency domain resource including contiguous frequency domain resource units such as the frequency domain resource unit 1, the frequency domain resource unit 2, and the frequency domain resource unit 3, or may be a frequency domain resource including discontiguous frequency domain resource units such as the frequency domain resource unit 1, the frequency domain resource unit 3, and the frequency domain resource unit 4.

The frequency domain resource unit may be an RB, or may be an RBG, a subband, a band, a BWP, or a CC. For example, both the frequency domain resource unit 1 and the frequency domain resource unit 2 are subbands, and one frequency domain resource segment is a band including two subbands. For another example, the frequency domain resource unit 1 is a band, and one frequency domain resource segment may also be the band.

2. Time Domain Resource Unit and One Time Domain Resource Segment

One time domain resource unit may be one symbol, one mini-slot, one slot, one subframe, or one frame. Duration of one subframe in time domain may be 1 millisecond (ms). One slot includes seven or 14 symbols, and one mini-slot may include at least one symbol (for example, two symbols, seven symbols, 14 symbols, or any quantity of symbols fewer than or equal to 14 symbols).

One time domain resource segment includes one or more time domain resource units, or consists of one or more time domain resource units. For example, one time domain resource unit is one symbol, and one time domain resource segment may be five or 10 symbols. Alternatively, one slot is considered as one time domain resource segment, and includes seven or 14 symbols. It should be noted that, one time domain resource unit may also include a plurality of symbols. For example, one time domain resource unit includes three symbols, and one time domain resource segment may include a plurality of time domain resource units each including three symbols.

Figure 6:
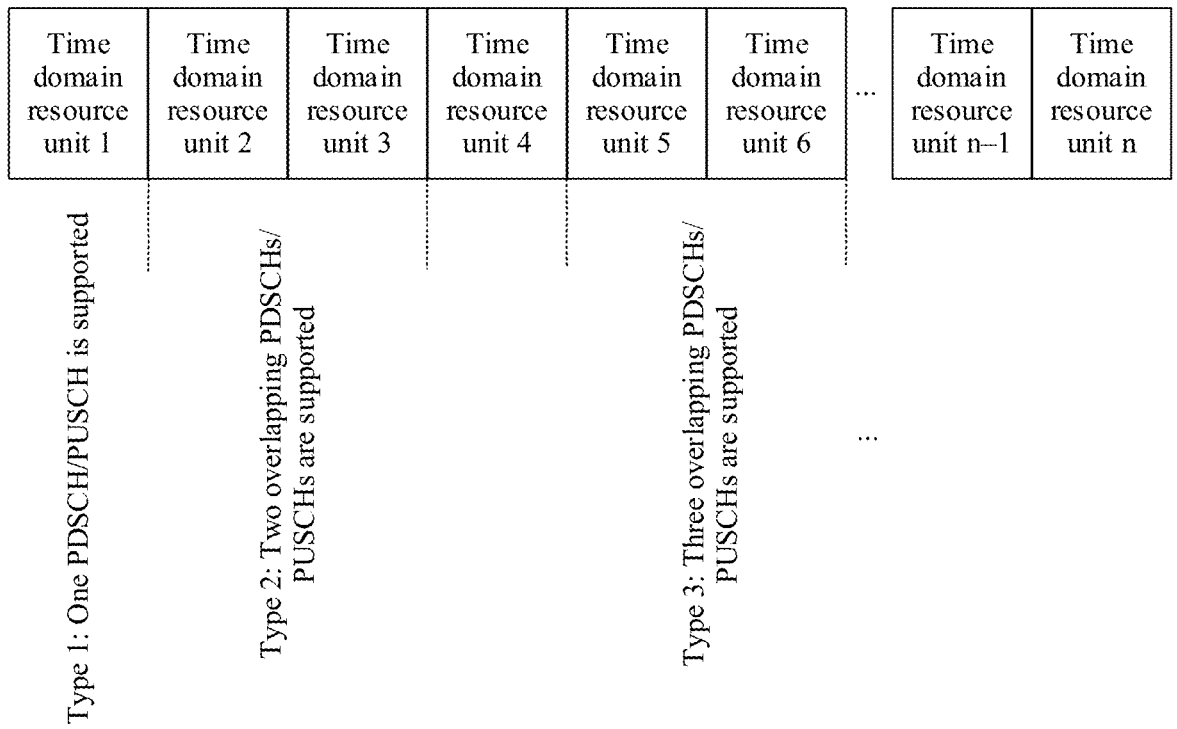
FIG. 6 is a schematic diagram of a time domain resource and a time domain resource unit according to an embodiment of this application.

FIG. 6 is used as an example. FIG. 6 shows n time domain resource units, such as a time domain resource unit 1, a time domain resource unit 2, a time domain resource unit 3, a time domain resource unit 4, a time domain resource unit 5, a time domain resource unit 6, . . . , a time domain resource unit n−1, and a time domain resource unit n.

One time domain resource segment may be a time domain resource including contiguous time domain resource units such as the time domain resource unit 1, the time domain resource unit 2, and the time domain resource unit 3, or may be a time domain resource including discontiguous time domain resource units such as the time domain resource unit 1, the time domain resource unit 3, and the time domain resource unit 4.

The time domain resource unit may be a symbol, or may be a mini-slot, a slot, a subframe, or a frame. For example, both the time domain resource unit 1 and the time domain resource unit 2 are symbols, and one time domain resource segment is a slot including 14 symbols. For another example, the time domain resource unit 1 is a slot, and one time domain resource segment may also be the slot.

A granularity of a time domain resource unit may alternatively be flexibly defined. For example, one time domain resource unit includes m symbols, where m is greater than or equal to 1.

3. Time-frequency Resource Unit and One Time-Frequency Resource Segment

A time-frequency resource unit may include a time domain resource and a frequency domain resource. In time domain, the time-frequency resource may include one or more time domain units. In frequency domain, the time-frequency resource may include one or more frequency domain units. One time-frequency resource segment includes one or more time-frequency resource units.

Figure 7:
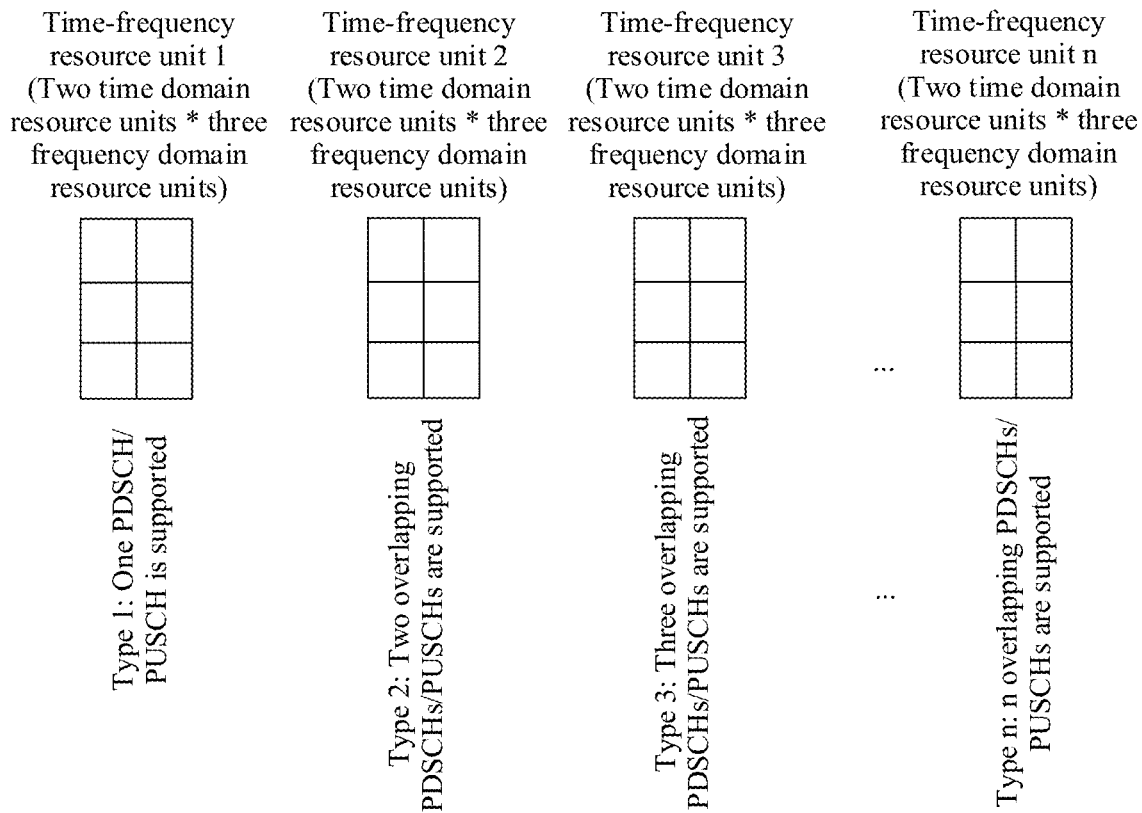
FIG. 7 is a schematic diagram of a time-frequency resource and a time-frequency resource unit according to an embodiment of this application.

FIG. 7 is used as an example. FIG. 7 shows n time-frequency resource units, such as a time-frequency resource unit 1, a time-frequency resource unit 2, a time-frequency resource unit 3, a time-frequency resource unit 4, . . . , and a time-frequency resource unit n. In the n time-frequency resource units, each time-frequency resource unit includes two time domain resource units in time domain, and includes three frequency domain resource units in frequency domain. Optionally, time domain resource units or frequency domain resource units included in the n time-frequency resource units may be different.

One time-frequency resource segment may be a time domain resource including contiguous time-frequency resource units such as the time-frequency resource unit 1, the time-frequency resource unit 2, and the time-frequency resource unit 3, or may be a time-frequency resource including discontiguous time-frequency resource units such as the time-frequency resource unit 1, the time-frequency resource unit 3, and the time-frequency resource unit 4.

4. Resource Scheduling

Specifically, in the embodiments of this application, data transmission (for example, uplink transmission or downlink transmission) may be performed based on resource scheduling by the network device. By way of example and not limitation, a time domain resource granularity of the scheduled data transmission may be, for example, a transmission time interval (TTI) or a short transmission time interval (sTTI).

A specific scheduling procedure is: A base station sends a control channel, for example, a physical downlink control channel (PDCCH), an enhanced physical downlink control channel (EPDCCH), or a physical downlink control channel used to schedule sTTI transmission (sPDCCH). The control channel may carry scheduling information that uses different downlink control information (DCI) and that is used to schedule a physical downlink shared channel (PDSCH) or a physical uplink shared channel (PUSCH). The scheduling information includes control information such as resource allocation information and a modulation and coding scheme. The terminal device detects the control channel, and receives a downlink data channel or sends an uplink data channel based on the scheduling information carried on the detected control channel.

5. Multi-Downlink Control Information Based Transmission

Based on the foregoing multi-transmission reception point scenario, to improve multi-site coordination performance, each TRP sends DCI, schedules a PDSCH of the TRP, and performs data transmission. This manner is generally referred to as a multi-downlink control information based multi-transmission reception point (multi-DCI based on multi-TRP) transmission solution; or may be specifically multiple physical downlink control channel based multi-transmission reception point transmission (Multiple PDCCH based multi-TRP transmission), where the physical downlink control channel may be used for PUSCH and PDSCH transmission; or multiple physical downlink control channel based multi-transmission reception point transmission for a physical downlink shared channel (Multiple PDCCH based multi-TRP transmission for PDSCH); or multiple physical downlink control channel based multi-transmission reception point transmission for a physical uplink shared channel (Multiple PDCCH based multi-TRP transmission for PUSCH). They are all referred to as multi-downlink control information based transmission for short in this application. In this transmission solution, one terminal corresponds to at least two PDCCHs or PUCCHs, or corresponds to at least two PUSCHs or PDSCHs, or corresponds to at least two PDSCHs and PUSCHs, or corresponds to at least two PDCCHs and PUCCHs.

6. Type of Multi-Downlink Control Information Based Transmission

On one resource unit, a quantity of overlapping PUCCHs or PDCCHs that is supported by the terminal, a quantity of overlapping PDCCHs and PUCCHs that is supported by the terminal, a quantity of overlapping PUSCHs or PDSCHs that is supported by the terminal, or a quantity of overlapping PDSCHs and PUSCHs that is supported by the terminal is referred to as a type of multi-downlink control information based transmission in the embodiments of this application.

For example, one type is that the terminal supports two overlapping PUSCHs or PDSCHs on one time-frequency resource unit. For another example, one type is that the terminal supports three overlapping PUSCHs or PDSCHs on one time-frequency resource unit. For another example, one type is that the terminal supports two overlapping PUSCHs or PDSCHs on one time domain resource unit. Another example is not described.

Specifically, FIG. 5 is used as an example. On the frequency domain resource unit 1, the terminal supports one overlapping PUSCH or PDSCH, which is referred to as a type 1. This case actually indicates that the terminal does not support multi-downlink control information based transmission. On the frequency domain resource unit 2, the terminal supports two overlapping PUSCHs or PDSCHs, which is referred to as a type 2. On the frequency domain resource unit 3 and the frequency domain resource unit 4, the terminal supports three overlapping PUSCHs or PDSCHs, which is referred to as a type 3, and so on. In this application, the type 1, the type 2, . . . , and a type n are merely used as names, and there may be another naming manner.

7. Quantity of Multi-Downlink Control Information Based Transmissions

A quantity of "multi-downlink control information based transmissions" that is supported by the terminal on one resource segment is referred to as a transmission quantity of multi-downlink control information based transmissions in this application. In each "multi-downlink control information based transmission", the terminal may support an overlapping PUSCH or PDSCH or support an overlapping PDSCH and PUSCH that is described in 6.

A quantity of resource units on which the terminal supports "multi-downlink control information based transmission" is referred to as a resource quantity for multi-downlink control information based transmission in this application. On each resource unit included in the resource segment, types of multi-downlink control information based transmissions supported by the terminal may be different.

For a time domain resource, if one "multi-downlink control information based transmission" occupies only one time domain resource unit, the resource quantity herein may indicate a transmission quantity of "multi-downlink control information based transmissions" that is supported by the terminal on the time domain resource segment. If one "multi-downlink control information based transmission" occupies a plurality of time domain resource units, the terminal needs to specifically report a transmission quantity of "multi-downlink control information based transmissions" that is supported by the terminal, or the terminal reports a quantity of time domain resource units occupied by each "multi-downlink control information based transmission", and a transmission quantity of "multi-downlink control information based transmissions" that is supported by the terminal may be deduced with reference to the resource quantity.

A quantity of overlapping PDSCHs or PUSCHs that is supported by the terminal on a predetermined resource segment is referred to as a channel quantity for multi-downlink control information based transmission in this application, and the channel quantity refers to a sum of quantities of overlapping PDSCHs or PUSCHs that are supported on all resource units.

If the terminal reports that types of "multi-downlink control information based transmissions" that are supported by the terminal on one resource segment are the same, a transmission quantity of "multi-downlink control information based transmissions" that is supported by the terminal may be deduced based on a same channel quantity and type of "multi-downlink control information based transmissions". Conversely, if the terminal reports a channel quantity for "multi-downlink control information based transmission" and a transmission quantity of "multi-downlink control information based transmissions" that are supported by the terminal, a type of the "multi-downlink control information based transmission" that is supported by the terminal may be deduced.

The foregoing resource segment may be one frequency domain resource segment, one time domain resource segment, or one time-frequency resource segment.

In this application, the quantity may also be referred to as a quantity or a number, and they have a same meaning, and may be interchanged. To better understand the type of the "multi-downlink control information based transmission", the transmission quantity of "multi-downlink control information based transmissions", the resource quantity for "multi-downlink control information based transmission", and the channel quantity for "multi-downlink control information based transmission", the following uses FIG. 5 to FIG. 7 as examples for description.

FIG. 5 is used as an example. Multi-downlink control information based transmission of the type 2 is supported on the frequency domain resource unit 2, multi-downlink control information based transmission of the type 3 is supported on the frequency domain resource unit 3 and the frequency domain resource unit 4, and multi-downlink control information based transmission of the type n is supported on the frequency domain resource unit n. Only one PDSCH or PUSCH is supported on the frequency domain resource unit 1, which indicates that multi-downlink control information based transmission is actually not supported on the frequency domain resource unit 1. Herein, it is considered as a special type of "multi-downlink control information based transmission", and is the type 1. There are n "multi-downlink control information based transmissions" in total. Therefore, the transmission quantity of "multi-downlink control information based transmissions" is n. In addition, multi-downlink control information based transmission is supported on each of the frequency domain resource unit 1 to the frequency domain resource unit n. In this case, the resource quantity for multi-downlink control information based transmission is n. Usually, n is a positive integer greater than or equal to 1. The channel quantity for multi-downlink control information based transmission is a sum of quantities of overlapping PDSCHs or PUSCHs that are supported for multi-downlink control information based transmissions of various types, that is, 1+2+3+4+ . . . +n.

It should be noted that, for a time domain resource, one "multi-downlink control information based transmission" may occupy a plurality of time domain resource units in time domain. FIG. 6 is used as an example. One time domain resource segment has n time domain resource units. "Multi-downlink control information based transmission" of the type 2 supports two overlapping PDSCHs/PUSCHs, and occupies the time domain resource unit 2 and the time domain resource unit 3 for transmission. "Multi-downlink control information based transmission" of the type 3 supports three overlapping PDSCHs/PUSCHs, and occupies the time domain resource unit 5 and the time domain resource unit 6 for transmission. When a transmission quantity of "multi-downlink control information based transmissions" in one time domain resource segment is calculated, a total quantity of "multi-downlink control information based transmissions" is calculated. FIG. 6 shows three "multi-downlink control information based transmissions".

For example, one time domain resource segment is one slot, and one time domain resource unit is one symbol. The slot includes 14 symbols. The first "multi-DCI based transmission" occupies a symbol 1. The second "multi-DCI based transmission" occupies a symbol 2 and a symbol 3, and overlap of a PDSCH 1 and a PDSCH 2 is supported on both the symbol 2 and the symbol 3. The third "multi-DCI based transmission" occupies a symbol 5 and a symbol 6, and overlap of a PDSCH 3, a PDSCH 4, and a PDSCH 6 is supported on the symbol 5 and the symbol 6. "Multi-DCI based transmission" is not supported on another symbol, and there are three "multi-DCI based transmissions" in the slot. The terminal reports that the transmission quantity of "multi-downlink control information based transmissions" that is supported by the terminal is 3. In addition, multi-downlink control information based transmission is supported on each of the time domain resource unit 1, the time domain resource unit 2, the time domain resource unit 3, the time domain resource unit 5, and the time domain resource unit 6, and the supported resource quantity for "multi-downlink control information based transmission" is 5. The channel quantity for multi-downlink control information based transmission is a sum of quantities of overlapping PDSCHs or PUSCHs that are supported for multi-downlink control information based transmissions of various types, that is, 1+2+3=6.

In another implementation, the type 1 supporting one PDSCH or PUSCH actually does not support multi-downlink control information based transmission. Therefore, the type 1 is not considered as a type supporting multi-downlink control information based transmission. In this case, the foregoing resource quantity, the transmission quantity, and the channel quantity each need to be subtracted by 1.

The time-frequency resource shown in FIG. 7 is similar to the frequency domain resource shown in FIG. 5, and details are not described again.

8. Resource Identifier

The resource identifier in this application indicates a number or an index number of a time domain resource unit, a frequency domain resource unit, or a time frequency resource unit. The terminal reports a resource identifier, to indicate resource units on which "multi-downlink control information based transmission" is supported.

The time domain resource shown in FIG. 6 is used as an example. The terminal may report identifiers 1, 2, 3, 5, and 6 of the time domain resource units to the network device, to indicate that "multi-downlink control information based transmission" is supported on the time domain resource unit 1, the time domain resource unit 2, the time domain resource unit 3, the time domain resource unit 5, and the time domain resource unit 6. To some extent, the terminal reports the resource identifier, so that the network device can learn of the capability of the terminal to support "multi-downlink control information based transmission". When one "multi-downlink control information based transmission" occupies a time domain resource unit, a quantity of reported identifiers of time domain resource units is the transmission quantity of "multi-downlink control information based transmissions".

The frequency domain resource shown in FIG. 5 and the time-frequency resource shown in FIG. 7 are similar to this, and details are not described again.

Figure 8:
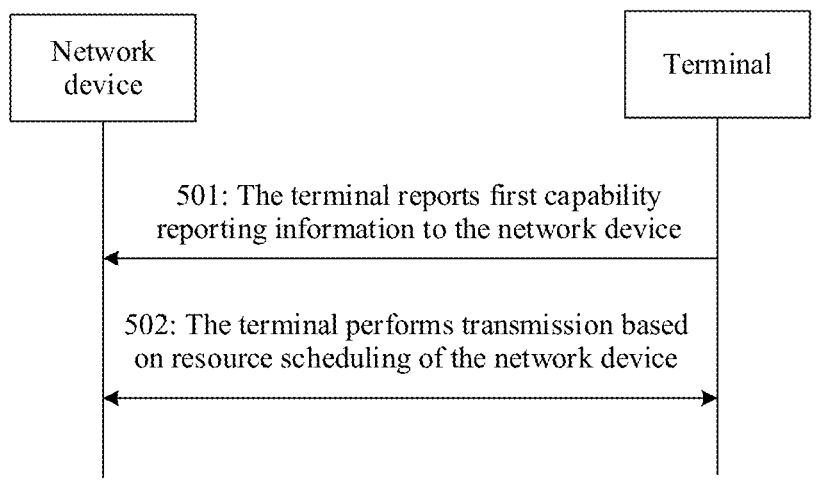
FIG. 8 is a flowchart of Embodiment 1 of a multi-downlink control information based transmission method according to an embodiment of this application.

FIG. 8 is a flowchart of Embodiment 1 of a multi-downlink control information based transmission method according to an embodiment of this application. The transmission method may be applied to a transmission indication system including a network device and a terminal. The network device may be any base station in the implementation environment shown in FIG. 1, and the terminal may be the terminal device in the implementation environment shown in FIG. 1.

Referring to FIG. 8, in this embodiment of this application, the multi-downlink control information based transmission method includes the following operations.

Operation 501: The terminal reports first capability reporting information to the network device, where the first capability reporting information indicates at least one of information indicating whether the terminal supports multi-downlink control information based transmission, a supported type of multi-downlink control information based transmission, or a supported quantity of multi-downlink control information based transmissions.

Operation 501 may be performed by the transceiver module 304 or the transceiver 404 of the terminal.

Operation 502: The terminal performs transmission based on resource scheduling of the network device.

Operation 502 may be performed by the processing module 302 or the processor 402 of the terminal.

The terminal reports the first capability reporting information to the network device, so that when performing resource scheduling, the network device considers a processing capability of the terminal for multi-DCI based transmission, and the terminal does not expect a transmission task scheduled by the network device for the terminal to exceed the processing capability of the terminal.

The terminal may report, to the network device, any one or more of the information indicating whether the terminal supports multi-downlink control information based transmission, the supported type of the multi-downlink control information based transmission, and the supported quantity of multi-downlink control information based transmissions. In this way, the network device can learn of the processing capability of the terminal to some extent.

That the first capability reporting information reported by the terminal to the network device indicates whether the terminal supports multi-downlink control information based transmission includes:

on one time-frequency resource unit, whether the terminal supports an overlapping physical downlink shared channel or physical uplink shared channel; or on one frequency domain resource unit, whether the terminal supports an overlapping physical downlink shared channel or physical uplink shared channel; or on one time domain resource unit, whether the terminal supports an overlapping physical downlink shared channel or physical uplink shared channel; or on one time-frequency resource segment, whether the terminal supports an overlapping physical downlink shared channel or physical uplink shared channel, where the time-frequency resource segment includes one or more time-frequency resource units; or on one frequency domain resource segment, whether the terminal supports an overlapping physical downlink shared channel or physical uplink shared channel, where the frequency domain resource segment includes one or more frequency domain resource units; or on one time domain resource segment, whether the terminal supports an overlapping physical downlink shared channel or physical uplink shared channel, where the time domain resource segment includes one or more time domain resource units.

For example, in FIG. 5, the terminal may report that an overlapping PDSCH or PUSCH is not supported on the frequency domain resource unit 1, and an overlapping PDSCH or PUSCH is supported on the frequency domain resource unit 2. Alternatively, the terminal may report an identifier (or an index number) of a frequency domain resource unit on which "multi-downlink control information based transmission" is supported, to indicate that an overlapping PDSCH or PUSCH is supported, and if an index number of a resource unit is not reported, it indicates that an overlapping PDSCH or PUSCH is not supported. For example, "2, 3, 4, . . . , n, supported" is reported. The terminal may further report an index number of a frequency domain resource on which multi-downlink control information based transmission is not supported, and if an index number of a frequency domain resource unit is not reported, it is considered by default that multi-downlink control information based transmission is supported. For example, "1, not supported" is reported.

For one frequency domain resource segment, for example, a frequency domain resource including the frequency domain resource units 2 to n, the terminal may also report that the terminal supports multi-downlink control information based transmission.

In an optional implementation, if the terminal reports whether the terminal supports multi-downlink control information based transmission on one frequency domain resource unit or one frequency domain resource segment, it indicates that the terminal supports multi-downlink control information based transmission on the frequency domain resource unit or the frequency domain resource segment. In another optional implementation, if the terminal does not report whether the terminal supports multi-downlink control information based transmission on one frequency domain resource unit or one frequency domain resource segment, it indicates by default that the terminal supports multi-downlink control information based transmission on the frequency domain resource unit or the frequency domain resource segment. In addition, the terminal reports that the terminal supports multi-downlink control information based transmission, and a type of multi-downlink control information based transmission that is supported by the terminal may be further indicated by default. The following information depends on a protocol definition or an agreement between the network device and the terminal: supporting multi-downlink control information based transmission being indicated by default by whether a reporting operation is performed, and a default supported type of multi-downlink control information based transmission.

multiple PDCCH based multi-TRP transmission for PDSCH, or multiple PDCCH based multi-TRP transmission for PUSCH.

In an optional embodiment, if the terminal supports multiple PDCCH based multi-TRP transmission, multiple PDCCH based multi-TRP transmission for PDSCH, or multiple PDCCH based multi-TRP transmission for PUSCH, it is considered by default that two or three TRPs perform simultaneous transmission on each BWP/CC/band on each symbol, that is, a maximum number of overlapping PDSCHs per BWP/CC/band per symbol is 2 or 3; or it is considered by default that two or three TRPs perform simultaneous transmission on each symbol (Maximum number of overlapping PDSCHs per symbol).

TABLE 1

| Definitions for parameters (Definitions for parameters) | Per | Mandatory | FDD TDD DIFF | FR 1 FR 2 DIFF |
|---|---|---|---|---|
| Multiple PDCCH based multi-TRP transmission (Multiple PDCCH based multi-TRP transmission for PDSCH/Multiple PDCCH based multi-TRP transmission for PUSCH) Whether the terminal supports multiple PDCCH based multi-TRP transmission, multiple PDCCH based multi-TRP transmission for PDSCH, or multiple PDCCH based multi-TRP transmission for PUSCH Candidate value: {supported}, {notSupported}, or {supported, notSupported} | FS/FSPC/ Band/BC/ UE | No/ Yes | No | Yes/No |

Note:
In Table 1, Per means "per"; Mandatory means "mandatory"; FDD means "frequency division duplex" (FDD); TDD means "time division duplex" (TDD); DIFF means "different" (different); FR means "frequency range" (FR); FS means "feature set" (FS); FSPC means "feature set per carrier" (FSPC); Band means "band"; BC means "band combination" (BC); UE means user equipment (UE), and is also the terminal in this application; No means "no"; Yes means "yes"; Supported means "support"; and "notSupported" means "not supported".

A case of reporting whether multi-downlink control information based transmission is supported on the time domain resource shown in FIG. 6 and the time-frequency resource shown in FIG. 7 is similar to this, and details are not described again.

As shown in Table 1, a capability of the terminal to support multi-downlink control information based transmission meets at least one item in the following Table 1. Optionally, the capability reporting information is included in a parameter "FeatureSetDownlinkPerCC (downlink parameter set per CC)" or a parameter "FeatureSetUplinkPerCC (uplink parameter set per CC)"; or may be included in a parameter "FeatureSetDownlink (downlink parameter set)" or "FeatureSetUplink (uplink parameter set)"; or may be included in a parameter "RF-parameters (radio frequency parameters)" or a parameter "mimo-ParametersPerBand (mimo parameters per band)"; and a candidate value of the capability may be supported (supported) or notSupported (not supported). That is, the candidate value may be from a set {supported, notSupported}. If the terminal does not report the capability, it is considered by default that the terminal does not support multi-downlink control information based transmission, that is, the terminal does not support multiple PDCCH based multi-TRP transmission, multiple PDCCH based multi-TRP transmission for PDSCH, or multiple PDCCH based multi-TRP transmission for PUSCH.

In an optional embodiment, if the terminal does not report the capability, it is considered by default that the terminal supports multiple PDCCH based multi-TRP transmission, In the foregoing descriptions, the terminal reports whether the terminal supports multi-downlink control information based transmission. On the basis that the terminal supports multi-downlink control information based transmission, the terminal may further report the supported type of the multi-downlink control information based transmission, or the terminal directly reports the type of the multi-downlink control information based transmission that is supported by the terminal. The type indicates a quantity of overlapping physical downlink shared channels or physical uplink shared channels that is supported by the terminal on one resource unit, and includes:

a maximum quantity of overlapping physical downlink shared channels or physical uplink shared channels that is supported by the terminal on one time-frequency resource unit; or a maximum quantity of overlapping physical downlink shared channels or physical uplink shared channels that is supported by the terminal on one frequency domain resource unit; or a maximum quantity of overlapping physical downlink shared channels or physical uplink shared channels that is supported by the terminal on one time domain resource unit.

The terminal reports the type of the multi-downlink control information based transmission that is supported by the terminal, to indicate a quantity of simultaneous multi-downlink control information based transmissions that is supported by the terminal.

For example, it is assumed that one time-frequency resource unit includes one time domain resource unit (for example, an OFDM symbol) corresponding to one frequency domain resource unit (BWP/CC/band), and the terminal reports a maximum quantity of overlapping PDSCHs (or PUSCHs) that is supported by the terminal in the time-frequency resource unit (the maximum number of overlapping PDSCHs (or PUSCHs) per BWP per symbol).

As shown in FIG. 7, one time-frequency resource unit includes three frequency domain resource units and two time domain resource units. The terminal may also report a maximum quantity of overlapping PDSCHs (or PUSCHs) that is supported by the terminal in the time-frequency resource unit.

As shown in FIG. 6, the terminal reports a maximum quantity of overlapping PDSCHs (or PUSCHs) that is supported by the terminal in the time domain resource unit 1 (for example, one OFDM symbol) (the maximum number of overlapping PDSCHs (or PUSCHs) per symbol). The maximum quantity of PUSCHs or the maximum quantity of PDSCHs herein may be 1, 2, 3, or 4.

As shown in FIG. 5, that the terminal reports a maximum quantity of overlapping PDSCHs (or PUSCHs) that is supported by the terminal in one frequency domain resource unit is similar to this, and details are not described again.

As shown in Table 2, a capability of the type of the multi-downlink control information based transmission that is supported by the terminal meets at least one item in the following Table 2. Optionally, the capability is included in the parameter "FeatureSetDownlinkPerCC" (or "FeatureSetUplinkPerCC parameter"); or may be included in the parameter "FeatureSetDownlink" (or the parameter "FeatureSetUplink"); and a candidate value of the capability may be obtained from a set {1, 2}, {1, 2, 3}, or {1, 2, 3, 4}.

If the terminal does not report the capability related to the supported type of the multi-downlink control information based transmission, it is considered by default that the maximum quantity supported by the terminal is 1. It should be noted that, a maximum quantity of PDSCHs that can overlap on a resource that is supported by the terminal is 1, that is, it indicates that the terminal does not support overlap between PDSCHs or PUSCHs on a time-frequency resource. Overlap on a time-frequency resource means that a same time-frequency resource is occupied.

supported quantity of multi-downlink control information based transmissions may be further reported, or the terminal directly reports the quantity of multi-downlink control information based transmissions that is supported by the terminal.

In a case, the first capability reporting information reported by the terminal indicates a quantity of "multi-downlink control information based transmissions" that is supported by the terminal on one resource segment, that is, a transmission quantity of "multi-downlink control information based transmissions" that is supported by the terminal.

In a case, the first capability reporting information reported by the terminal indicates that the quantity of multi-downlink control information based transmissions that is supported by the terminal is a resource quantity, and on a resource unit corresponding to the resource quantity, the terminal supports an overlapping physical downlink shared channel or physical uplink shared channel, or supports an overlapping physical downlink shared channel and physical uplink shared channel. The resource quantity includes:

a quantity of time-frequency resource units for the multi-downlink control information based transmission that is supported by the terminal; or a quantity of frequency domain resource units for the multi-downlink control information based transmission that is supported by the terminal; or a quantity of time domain resource units for the multi-downlink control information based transmission that is supported by the terminal.

In a case, the terminal reports a resource identifier by using the first capability reporting information, to indicate resource units on which "multi-downlink control information based transmission" is supported. The resource identifier may be:

an identifier of a time-frequency resource unit for the multi-downlink control information based transmission that is supported by the terminal; or an identifier of a frequency domain resource unit for the multi-downlink control information based transmission that is supported by the terminal; or an identifier of a time domain resource unit for the multi-downlink control information based transmission that is supported by the terminal.

TABLE 2

| Definitions for parameters (Definitions for parameters) | Per | Mandatory | FDD TDD DIFF | FR 1 FR 2 DIFF |
|---|---|---|---|---|
| Maximum number of overlapping PDSCHs/PUSCHs per BWP/CC per symbol (Maximum number of overlapping PDSCHs/PUSCHs per symbol) Maximum quantity of overlapping PDSCHs/PUSCHs that is supported by the terminal on one OFDM symbol on one BWP/CC (maximum quantity of overlapping PDSCHs/PUSCHs that is supported by the terminal on one OFDM symbol) Candidate value: {1, 2}, {1, 2, 3}, or {1, 2, 3, 4} | FS/ FSPC/ band/ UE/ BC | Yes/ No | No | Yes/No |

Note:
In Table 2, Per means "per"; Mandatory means "mandatory"; FDD means "frequency division duplex" (FDD); TDD means "time division duplex" (TDD); DIFF means "different" (different); FR means "frequency range" (FR); FS means "feature set" (FS); FSPC means "feature set per carrier" (FSPC); BC means "band combination" (BC); UE means user equipment (UE), and is also the terminal in this application; No means "no"; and Yes means "yes".

In the foregoing descriptions, the terminal reports the type of the multi-downlink control information based transmission that is supported by the terminal. On this basis, the To some extent, the terminal reports the resource identifier, so that the network device can learn of the capability of the terminal to support "multi-downlink control information based transmission". When one "multi-downlink control information based transmission" occupies a time domain resource unit, a quantity of reported identifiers of time domain resource units is the transmission quantity of "multi-downlink control information based transmissions".

It should be noted that, when "multi-downlink control information based transmissions" is supported on each resource unit, and supported types of multi-downlink control information based transmissions may be the same, only a quantity, identifiers, or index numbers of resource units need to be reported. That is, it indicates by default that the types of the multi-downlink control information based transmissions supported on the resource units are the same. Alternatively, the types of the multi-downlink control information based transmissions that are supported by the terminal on the resource units may be different. When the types are different, types of multi-downlink control information based transmissions corresponding to resource units indicated by different identifiers or index numbers may be separately reported. In this case, a quantity of resource units may not need to be reported.

FIG. 5 is used as an example. If the terminal may report that a supported quantity of frequency domain resource units for multi-downlink control information based transmission domain resource units may be reported. A supported type may be a default type, for example, the type 2 or the type 3, specified in a protocol.

FIG. 6 and FIG. 7 are similar to this, and details are not described again.

A possible form in which the terminal reports the transmission quantity of multi-downlink control information based transmissions that is supported by the terminal is that the terminal reports a supported quantity of multiple PDCCH based multi-TRP transmissions, or a supported quantity of frequency domain resource units (for example, cells/BWPs/CCs/bands) for multiple PDCCH based multi-TRP transmission, to indicate a quantity of cells/BWPs/CCs/bands on which the terminal supports multiple PDCCH based multi-TRP transmission, as shown in Table 3.

It should be noted that the terminal may simultaneously support multiple PDCCH based multi-TRP transmission on these cells/BWPs/CCs/bands, or may not simultaneously support multiple PDCCH based multi-TRP transmission. This is not limited in this embodiment. In an optional embodiment the terminal supports n multiple PDCCH based multi-TRP transmissions, which corresponds to the first n cells/BWPs/CCs/bands (in ascending order of IDs) configured for the terminal, or corresponds to the last n BWPs/CCs/bands configured for the terminal (in ascending order of IDs), where n is an integer greater than or equal to 0.

TABLE 3

| Definitions for parameters (Definitions for parameters) | Per | Mandatory | FDD TDD DIFF | FR 1 FR 2 DIFF |
|---|---|---|---|---|
| Maximum number of multiple PDCCH based multi-TRP transmissions (Maximum number of BWP/CC/band multiple PDCCH based multi-TRP transmissions) Maximum quantity of resource units for multiple PDCCH based multi-TRP transmission that is supported by the terminal or maximum quantity of cells/BWPs/CCs/bands for multiple PDCCH based multi-TRP transmission that is supported by the terminal Candidate value: {0, 1, 2}, {1, 2}, {1, 2, 3, . . . , 32}, {0, 1, 2, 3, . . . , maxNrofServingCells}, or {1, 2, 3, . . . , maxNrofServingCells} | FS/ UE/ BC | Yes/No | No | Yes/No |

Note:
In Table 3, Per means "per"; Mandatory means "mandatory"; FDD means "frequency division duplex" (FDD); TDD means "time division duplex" (TDD); DIFF means "different" (different); FR means "frequency range" (FR); FS means "feature set" (FS); BC means "band combination" (BC); UE means user equipment (UE), and is also the terminal in this application; No means "no"; Yes means "yes"; and maxNrofServingCells means "maximum quantity of serving cells".

is n−1, it indicates that multi-downlink control information based transmission is supported on the first n−1 frequency domain resource units of one frequency domain resource segment, or indicates that multi-downlink control information based transmission is supported on the last n−1 frequency domain resource units.

For another example, the terminal may report an index number or an identifier, for example, 2, 3, 4, . . . , or n, of a frequency domain resource unit on which multi-downlink control information based transmission is supported. Further, the terminal may further report a type of multi-downlink control information based transmission supported on each frequency domain resource. For example, the frequency domain resource unit 1 supports the type 1, the frequency domain resource unit 2 supports the type 2, and the frequency domain resource units 3 and 4 support the type 3. For another example, if types supported by the frequency domain resource units 1, 2, 3, 4, . . . , and n are the same, only a quantity, index numbers, or identifiers of frequency In another possible implementation, the terminal may further report a channel quantity for multi-downlink control information based transmission that is supported by the terminal in one predetermined time domain resource segment, and the channel quantity is a quantity of overlapping physical downlink shared channels or physical uplink shared channels that is supported by the terminal on the time domain resource segment.

In another possible implementation, the terminal reports frequency domain resource units (BWPs/CCs/bands) on which multiple PDCCH based multi-TRP transmission is supported, as shown in Table 4. It should be noted that the terminal may simultaneously support multiple PDCCH based multi-TRP transmission, multiple PDCCH based multi-TRP transmission for PDSCH, or multiple PDCCH based multi-TRP transmission for PUSCH on these BWPs/CCs/bands, or may not simultaneously support multiple PDCCH based multi-TRP transmission, multiple PDCCH based multi-TRP transmission for PDSCH, or multiple PDCCH based multi-TRP transmission for PUSCH. This is not limited in this embodiment.

The terminal may report, by using a bitmap, frequency domain resource units on which multi-downlink control information based transmission is supported.

TABLE 4

| Definitions for parameters (Definitions for parameters) | Per | Mandatory | FDD TDD DIFF | FR 1 FR 2 DIFF |
|---|---|---|---|---|
| Multiple PDCCH based multi-TRP transmission (Multiple PDCCH based multi-TRP transmission for PDSCH/Multiple PDCCH based multi-TRP transmission for PUSCH) BWPs/CCs/bands on which the terminal supports multiple PDCCH based multi-TRP transmission, BWPs/CCs/bands on which the terminal supports multiple PDCCH based multi-TRP transmission for PDSCH, or BWPs/CCs/bands on which the terminal supports multiple PDCCH based multi-TRP transmission for PUSCH Candidate value: BIT STRING (SIZE (32)) or BIT STRING (SIZE (maxNrofServingCells)) | FS/ BC/ UE | No/Yes | No | Yes/No |

Note:
In Table 4, Per means "per"; Mandatory means "mandatory"; FDD means "frequency division duplex" (FDD); TDD means "time division duplex" (TDD); DIFF means "different" (different); FR means "frequency range" (FR); FS means "feature set" (FS); BC means "band combination" (BC); UE means user equipment (UE), and is also the terminal in this application; No means "no"; Yes means "yes"; BIT STRING means "bit string"; Size means "size"; and maxNrofServingCells means "maximum quantity of serving cells".

The "BIT STRING" is used in the following example: For example, there are eight serving cells, and the "BIT STRING" has eight bits, for example, 10001000, where 1 indicates that multi-downlink control information based transmission is supported in a corresponding serving cell, and 0 indicates that multi-downlink control information based transmission is not supported in a corresponding serving cell. The foregoing bit string indicates that multi-downlink control information based transmission is supported in a serving cell 0 and a serving cell 4, and multi-downlink control information based transmission is not supported in other cells.

The terminal may further report a transmission quantity of a plurality of multiple PDCCH based multi-TRP transmissions that may be supported by the terminal on each BWP/CC/band in one predetermined time domain resource segment. For example, two multiple PDCCH based multi-TRP transmissions may be allowed in one slot. In this case, it is equivalent to describing that the terminal reports that the transmission quantity of multi-downlink control information based transmissions that is supported on one time-frequency resource segment including one slot and one BWP/CC/band is 2.

On each BWP/CC/band, only one multiple PDCCH based multi-TRP transmission is allowed in one predetermined time domain resource segment, for example, only one multiple PDCCH based multi-TRP transmission is allowed in one slot. In this case, it is equivalent to describing that the terminal reports that the transmission quantity of multi-downlink control information based transmissions that is supported on one time-frequency resource segment including one slot and one BWP/CC/band is 1.

A time unit of the predetermined time domain resource segment may be a slot, or may be an OFDM symbol. The time unit may be specified in a protocol, or may be reported as a capability of the terminal. In this case, it is equivalent to describing that the terminal reports the transmission quantity of multi-downlink control information based transmissions that is supported on one time-frequency resource segment.

In the embodiments shown in Table 3 and Table 4, for each cell, the terminal is allowed to activate one BWP/CC/band.

The foregoing resource quantity, transmission quantity, or channel quantity may be included in the parameter "FeatureSetDownlink", or optionally, may be included in the parameter "RF-parameters" or the parameter "mimo-ParametersPerBand".

In another possible implementation, in each cell, the terminal is allowed to activate a plurality of BWPs/CCs/bands. In this case, the terminal reports a quantity of (specific) BWPs/CCs/bands on which multiple PDCCH based multi-TRP transmission is supported, as shown in Table 5.

It should be noted that the terminal may simultaneously support multiple PDCCH based multi-TRP transmission on these BWPs/CCs/bands, or may not simultaneously support multiple PDCCH based multi-TRP transmission. This is not limited in this embodiment.

In a possible form, the terminal reports a transmission quantity of BWPs/CCs/bands on which multiple PDCCH based multi-TRP transmission is supported, that is, a quantity of BWPs/CCs/bands on which multiple PDCCH based multi-TRP transmission is supported.

In an optional embodiment, the terminal supports multiple PDCCH based multi-TRP transmission on n BWPs/CCs/bands, which corresponds to the first n BWPs/CCs/bands configured or activated for the terminal (in ascending order of IDs), where n is an integer greater than or equal to 0.

In another possible implementation, the terminal reports BWPs/CCs/bands on which multiple PDCCH based multi-TRP transmission is supported, that is, reports an identifier of the BWP/CC/band on which multiple PDCCH based multi-TRP transmission is supported. Specifically, indication may be performed by using a bit string, for example, "BIT STRING" indication shown in Table 5.

It should be noted that the terminal may simultaneously support multiple PDCCH based multi-TRP transmission on these BWPs/CCs/bands, or may not simultaneously support multiple PDCCH based multi-TRP transmission. This is not limited in this embodiment.

In an optional embodiment, there are the following two possibilities on each BWP/CC/band. This is not limited in this embodiment.

(1) A plurality of multiple PDCCH based multi-TRP transmissions may be supported on each BWP/CC/band, for example, two multiple PDCCH based multi-TRP transmissions may be allowed in one slot. In this case, it is equivalent to describing that the terminal reports that the transmission quantity of multi-downlink control information based transmissions that is supported on one time-frequency resource segment including one slot and one BWP/CC/band is 2.

(2) On each BWP/CC/band, only one multiple PDCCH based multi-TRP transmission is allowed in a predetermined time domain resource, for example, only one multiple PDCCH based multi-TRP transmission is allowed in one slot. In this case, it is equivalent to describing that the terminal reports that the transmission quantity of multi-downlink control information based transmissions that is supported on one time-frequency resource segment including one slot and one BWP/CC/band is 1.

The foregoing specific time unit may be a slot, or may be an OFDM symbol. The time unit may be specified in a protocol, or may be reported as a capability of the terminal.

TABLE 5

| Definitions for parameters (Definitions for parameters) | Per | Mandatory | FDD TDD DIFF | FR 1 FR 2 DIFF |
|---|---|---|---|---|
| Maximum number of BWP multiple PDCCH based multi-TRP transmissions<br>Supported maximum quantity of BWPs on which the terminal supports multiple PDCCH based multi-TRP transmission<br>Candidate value: {0, 1, 2, 3}, {1, 2, 3}, BIT STRING (SIZE (3)), or BIT STRING (SIZE (maxNrofBWP)) | FS/<br>UE/BC/<br>FSPC/<br>Band | Yes/No | No | Yes/No |

Note:
In Table 5, Per means "per"; Mandatory means "mandatory"; FDD means "frequency division duplex" (FDD); TDD means "time division duplex" (TDD); DIFF means "different" (different); FR means "frequency range" (FR); FS means "feature set" (FS); FSPC means "feature set per carrier" (FSPC); BC means "band combination" (Band Combination, BC); Band means "band"; UE means user equipment (UE), and is also the terminal in this application; No means "no"; Yes means "yes"; BIT STRING means "bit string"; Size means "size"; and maxNrofBWP means "maximum quantity of BWPs".

In another possible implementation, the terminal may further report a channel quantity or a resource quantity for multi-downlink control information based transmission that is supported by the terminal in one predetermined time domain resource segment.

The foregoing resource quantity, transmission quantity, or channel quantity may be included in the parameter "FeatureSetDownlinkPerCC" (or the parameter "FeatureSetUplinkPerCC"), or optionally, may be included in the parameter "FeatureSetDownlink" (or the parameter "FeatureSetUplink"), or optionally, may be included in the parameter "RF-parameters" or the parameter "mimo-ParametersPerBand".

In a possible implementation, the terminal reports a transmission quantity of multiple PDCCH based multi-TRP transmissions that is supported in one time domain resource segment.

In a manner, the terminal reports a transmission quantity of multiple PDCCH based multi-TRP transmissions that is supported on one BWP/CC/band in one time domain resource segment. In other words, the terminal reports a quantity of multiple PDCCH based multi-TRP transmissions that is supported on one time-frequency resource segment (a time-frequency resource including a plurality of time-frequency resource units and one BWP/CC/band), as shown in Table 6.

In one embodiment, an example in which one time domain resource segment is one slot is used. In practice, the time domain resource segment may alternatively be n symbols or n slots, where n is a positive integer. In this case, a value is specified, and a quantity of multiple PDCCH based multi-TRP transmissions that is supported by the terminal on all BWPs/CCs/bands is the value. A candidate value of the value is obtained from a set {0, 1}, {1, 2}, {0, 1, 2}, {1, 2, 4, 8}, or {0, 1, 2, 4, 8}.

If the terminal does not report the capability, the terminal may have one of the following default behaviors. This is not limited in this embodiment:

(1) It is considered by default that the terminal does not support multiple PDCCH based multi-TRP transmission.

(2) The terminal supports only one multi-DCI based multi-TRP transmission in one predetermined time domain resource segment.

TABLE 6

| Definitions for parameters (Definitions for parameters) | Per | Mandatory | FDD TDD DIFF | FR 1 FR 2 DIFF |
|---|---|---|---|---|
| Maximum number of multiple PDCCH based multi-TRP transmissions per BWP/CC/band per slot<br>Maximum quantity of multiple PDCCH based multi-TRP transmissions that is supported by the terminal on one BWP/CC/band<br>Candidate value: {0, 1}, {1, 2}, {0, 1, 2}, {1, 2, 4, 8}, or {0, 1, 2, 4, 8} | FS/ UE/ BC | Yes/ No | No | Yes/No |

Note:
In Table 6, Per means "per"; Mandatory means "mandatory"; FDD means "frequency division duplex" (FDD); TDD means "time division duplex" (TDD); DIFF means "different" (different); FR means "frequency range" (FR); FS means "feature set" (FS); BC means band combination (BC); UE means user equipment (UE), and is also the terminal in this application; No means "no"; Yes means "yes"; BIT STRING means "bit string"; Size means "size"; and maxNrofBWP means "maximum quantity of BWPs".

In another manner, on each BWP/CC/band, the terminal reports a maximum quantity of the transmission quantity of multiple PDCCH based multi-TRP transmissions that is supported in one time domain resource segment. In this case, a plurality of values are specified, and each BWP/CC/band corresponds to a value. A candidate value may be obtained from a set {0, 1}, {1, 2}, {0, 1, 2}, {1, 2, 4, 8}, or {0, 1, 2, 4, 8}, as shown in Table 7.

TABLE 7

| Definitions for parameters (Definitions for parameters) | Per | Mandatory | FDD TDD DIFF | FR 1 FR 2 DIFF |
|---|---|---|---|---|
| Maximum number of multiple PDCCH based multi-TRP transmissions per slot<br>Maximum quantity of multiple PDCCH based multi-TRP transmissions that is supported by the terminal<br>Candidate value: {0, 1}, {1, 2}, {0, 1, 2}, {1, 2, 4, 8}, or {0, 1, 2, 4, 8} | FS/FSPC/ Band/BC | Yes/No | No | Yes/No |

Note:
In Table 7, Per means "per"; Mandatory means "mandatory"; FDD means "frequency division duplex" (frequency division duplex, FDD); TDD means "time division duplex" (TDD); DIFF means "different" (different); FR means "frequency range" (FR); FS means "feature set" (FS); FSPC means "feature set per carrier" (FSPC); Band means "band"; BC means "band combination" (BC); No means "no"; and Yes means "yes".

In another possible implementation, on a specific or each BWP/CC/band, the terminal may further report a channel quantity or a resource quantity for multi-downlink control information based transmission that is supported by the terminal in one predetermined time domain resource segment.

The foregoing resource quantity, transmission quantity, or channel quantity may be included in the parameter "FeatureSetDownlinkPerCC", or optionally, may be included in the parameter "FeatureSetDownlink", or optionally, may be included in the parameter "RF-parameters" or the parameter "mimo-ParametersPerBand".

If the terminal does not report the capability, the terminal may have one of the following default behaviors. This is not limited in this embodiment:

(1) It is considered by default that the terminal does not support multiple PDCCH based multi-TRP transmission.

(2) The terminal supports only one multi-DCI based multi-TRP transmission in one predetermined time domain resource segment.

(3) The terminal does not support multiple PDCCH based multi-TRP transmission on a specific BWP/CC/band.

(4) The terminal supports only one multiple PDCCH based multi-TRP transmission on a specific BWP/CC/band in a specific time domain resource segment.

In another possible implementation, the terminal reports a transmission quantity of multiple PDCCH based multi-TRP transmissions that is supported in one predetermined time domain resource segment, to indicate a total quantity of multiple PDCCH based multi-TRP transmissions that is supported by the terminal on all BWPs/CCs/bands. A candidate value of the quantity is obtained from a set {0, 1}, {1, 2}, {0, 1, 2}, {1, 2, 4, 8}, or {0, 1, 2, 4, 8}, as shown in Table 8.

TABLE 8

| Definitions for parameters (Definitions for parameters) | Per | Mandatory | FDD TDD DIFF | FR 1 FR 2 DIFF |
|---|---|---|---|---|
| Maximum number of multiple PDCCH based multi-TRP transmissions per slot<br>Maximum quantity of multiple PDCCH based multi-TRP transmissions that is supported by the terminal<br>Candidate value: {0, 1}, {1, 2}, {0, 1, 2}, {1, 2, 4, 8}, or {0, 1, 2, 4, 8} | FS/UE/BC | Yes/No | No | Yes/No |

Note:
In Table 8, Per means "per"; Mandatory means "mandatory"; FDD means "frequency division duplex" (FDD); TDD means "time division duplex" (TDD); DIFF means "different" (different); FR means "frequency range" (FR); FS means "feature set" (FS); BC means "band combination" (BC); UE means user equipment (UE), and is also the terminal in this application; No means "no"; Yes means "yes";

In another possible implementation, the terminal may further report a channel quantity or a resource quantity for multi-downlink control information based transmission that is supported by the terminal in one predetermined time domain resource segment.

Optionally, the foregoing resource quantity, transmission quantity, or channel quantity may be included in the parameter "FeatureSetDownlink", or optionally, may be included in the parameter "RF-parameters" or the parameter "mimo-ParametersPerBand". A format is as follows:

If the terminal does not report the capability, the terminal may have one of the following default behaviors. This is not limited in this embodiment:

(1) It is considered by default that the terminal does not support multiple PDCCH based multi-TRP transmission.

(2) The terminal supports only one multi-DCI based multi-TRP transmission in one predetermined time domain resource segment.

In some embodiments of this application, a manner is further provided, where the terminal reports a quantity of time domain resource units between "multi-downlink control information based transmissions" that is supported on one resource segment.

For example, the terminal reports a minimum quantity of OFDM symbols/slots between multiple PDCCH based multi-TRP transmissions that is supported on one BWP/CC/band, as shown in Table 9.

TABLE 9

| Definitions for parameters (Definitions for parameters) | Per | Mandatory | FDD TDD DIFF | FR 1 FR 2 DIFF |
|---|---|---|---|---|
| Minimum number of OFDM symbols/slots between multi-TRP transmissions<br>Minimum quantity of OFDM symbols/slots between multiple PDCCH based multi-TRP transmissions that is supported by the terminal<br>Candidate value: {1, 2}, {1, 2, 4}, or {1, 2, 4, 8} | FS/UE/BC | Yes/No | No | Yes/No |

Note:
In Table 9, Per means "per"; Mandatory means "mandatory"; FDD means "frequency division duplex" (FDD); TDD means "time division duplex" (TDD); DIFF means "different" (different); FR means "frequency range" (FR); FS means "feature set" (FS); BC means "band combination" (BC); UE means user equipment (UE), and is also the terminal in this application; No means "no"; Yes means "yes";

In another manner, a manner is further provided, where the terminal reports a quantity of time domain resource units between "multi-downlink control information based transmissions" that is supported on each resource unit.

For example, on each BWP/CC/band, a minimum quantity of OFDM symbols/slots between multiple PDCCH based multi-TRP transmissions that is supported on each BWP/CC/band is specified, as shown in Table 10.

TABLE 10

| Definitions for parameters (Definitions for parameters) | Per | Mandatory | FDD TDD DIFF | FR 1 FR 2 DIFF |
|---|---|---|---|---|
| Minimum number of OFDM symbols/slots between multi-TRP transmissions | FS/FSPC/Band/BC | Yes/No | No | Yes/No |

TABLE 10-continued

| Definitions for parameters (Definitions for parameters) | Per | Mandatory | FDD TDD DIFF | FR 1 FR 2 DIFF |
|---|---|---|---|---|
| Minimum quantity of OFDM symbols/slots between multiple PDCCH based multi-TRP transmissions that is supported by the terminal Candidate value: {1, 2}, {1, 2, 4}, or {1, 2, 4, 8} | | | | |

Note:
In Table 10, Per means "per"; Mandatory means "mandatory"; FDD means "frequency division duplex" (FDD); TDD means "time division duplex" (TDD); DIFF means "different" (different); FR means "frequency range" (FR); FS means "feature set" (FS); FSPC means "feature set per carrier" (FSPC); Band means "band"; BC means "band combination" (BC); No means "no"; and Yes means "yes".

Figure 9:
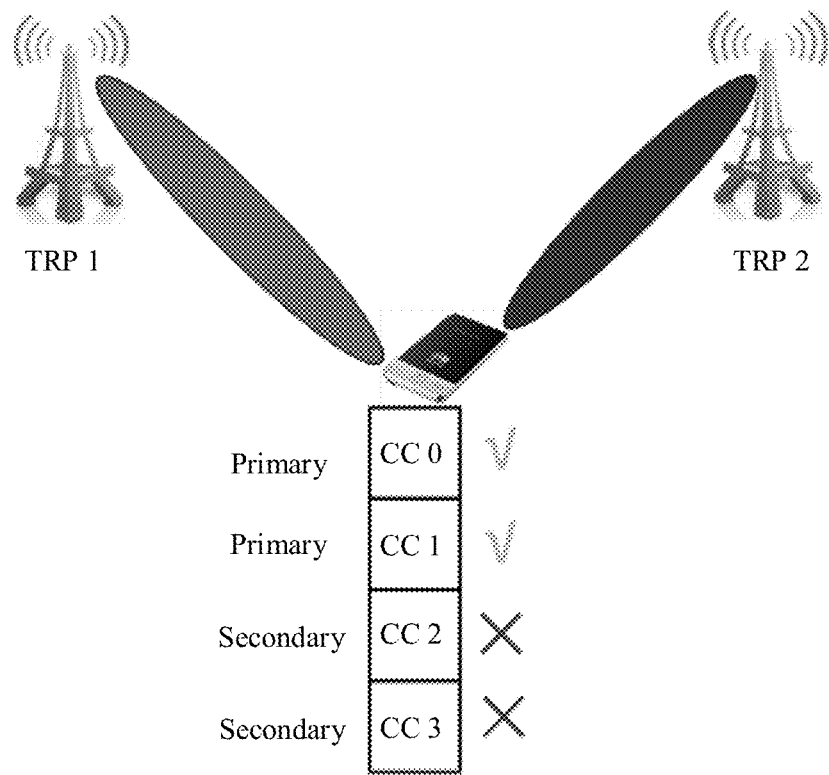
FIG. 9 is a schematic diagram of a scenario in which CA/DC and multi-DCI multi-site coordination coexist according to an embodiment of this application.

When the terminal is in a scenario in which CA/DC and multi-DCI multi-site coordination coexist and that is shown in FIG. 9, two transmission reception points TRP 1 and TRP 2 may both send DCI to the terminal, and the terminal is within a service range of a primary cell group and a secondary cell group. The primary cell group includes two cells: a primary cell-CC 0 and a secondary cell-CC 1. The secondary cell group includes two cells: a primary cell-CC 2 and a secondary cell-CC 3.

In this scenario, it may be configured in such a manner that multi-DCI based multi-TRP transmission can be performed in any CA/DC cell according to a protocol constraint, or based on configuration information sent by the network device to the terminal.

Alternatively, the network device configures, for the terminal, whether multi-DCI based multi-TRP transmission can be performed in a specific cell group (specific cell groups) or a specific cell (specific cells)/a specific BWP (specific BWPs).

The network device configures, for the terminal in two manners, whether multi-DCI based multi-TRP transmission can be performed in a specific cell group (specific cell groups) or a specific cell (specific cells)/a specific BWP (specific BWPs):

One manner is explicit configuration through signaling. For example, it is configured in such a manner that multi-DCI based multi-TRP transmission can be performed only in a cell in the primary cell group, or multi-DCI based multi-TRP transmission can be performed only in the primary cell in the primary cell group, or multi-DCI based multi-TRP transmission can be performed only in the primary cell in the primary cell group and the primary cell in the secondary cell group.

In the other manner, some parameters (for example, PDCCH-config) of a specific cell group (specific cell groups) or a specific cell (specific cells)/a specific BWP (specific BWPs) use two configurations, to implicitly configure in such a manner that multi-DCI based multi-TRP transmission can be performed in the specific cell group (specific cell groups) or the specific cell (specific cells)/the specific BWP (specific BWPs).

If the terminal reports that the terminal supports multi-downlink control information based transmission on a specific resource unit or one resource segment, it may be considered by default that the multi-downlink control information based transmission supported by the terminal on the resource unit or the resource segment is one of the following:

(1) The terminal can support multi-DCI based multi-TRP transmission in any cell (cell).

(2) The terminal supports multi-DCI based multi-TRP transmission only in the cell in the primary cell group (cell group).

(3) The terminal supports multi-DCI based multi-TRP transmission only in the primary cell in the primary cell group.

(4) The terminal supports multi-DCI based multi-TRP transmission only in the primary cell in the primary cell group and the primary cell in the secondary cell group.

If the terminal does not report a type of multi-downlink control information based transmission that is supported by the terminal, or does not report the first capability reporting information indicating the resource quantity, the transmission quantity, or the channel quantity, the terminal may have one of the following default behaviors. This embodiment is not limited thereto.

(1) It is considered by default that the terminal does not support multiple PDCCH based multi-TRP transmission.

(2) The terminal can support multi-DCI based multi-TRP transmission in any cell in the CA/DC scenario.

(3) The terminal supports multi-DCI based multi-TRP transmission only in the cell in the primary cell group.

(4) The terminal supports multi-DCI based multi-TRP transmission only in the primary cell in the primary cell group.

(5) The terminal supports multi-DCI based multi-TRP transmission only in the primary cell in the primary cell group and the primary cell in the secondary cell group.

In the foregoing descriptions, the terminal reports, to the network device, the first capability reporting information indicating at least one of the information indicating whether the terminal supports multi-downlink control information based transmission, the supported type of the multi-downlink control information based transmission, or the supported quantity of multi-downlink control information based transmissions. Actually, another capability of the terminal may also be reported to the network device, so that the network device better schedules the terminal to perform transmission.

The following separately describes various types of capability reporting information reported by the terminal to the network device.

Figure 10:
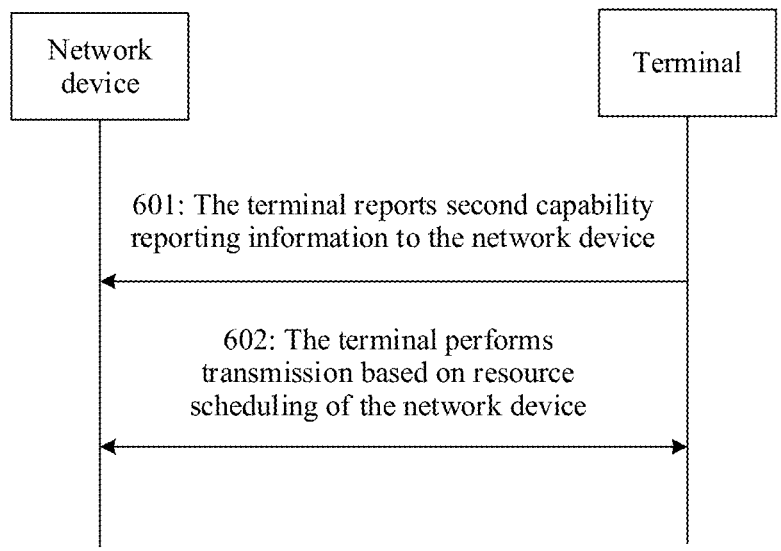
FIG. 10 is a flowchart of Embodiment 2 of a multi-downlink control information based transmission method according to an embodiment of this application.

FIG. 10 is a flowchart of Embodiment 2 of a multi-downlink control information based transmission method according to an embodiment of this application. The transmission method may be applied to a transmission indication system including a network device and a terminal. The network device may be any base station in the implementation environment shown in FIG. 1, and the terminal may be the terminal device in the implementation environment shown in FIG. 1.

Referring to FIG. 10, in this embodiment of this application, the multi-downlink control information based transmission method includes the following operations.

Operation 601: The terminal reports second capability reporting information to the network device, where the second capability reporting information indicates whether the terminal shares a carrier aggregation or dual connectivity processing capability.

Operation 602: The terminal performs transmission based on resource scheduling of the network device.

The shared processing capability includes a shared quantity of blind detections or a shared quantity of CCEs.

In a possible implementation, the second capability reporting information may be reported in combination with the foregoing first capability reporting information, that is, the terminal reports whether a capability related to multiple PDCCH based multi-TRP transmission and a processing capability to support carrier aggregation or dual connectivity can be shared.

In a possible implementation, the second capability reporting information reported by the terminal to the network device is further used to indicate a maximum quantity of frequency domain resource units for multi-downlink control information based transmission that is supported by the terminal.

During specific implementation, the terminal reports the second capability reporting information, to indicate whether the capability of the terminal to support multiple PDCCH based multi-TRP transmission and CA/DC can be shared and a maximum quantity of CCs/BWPs/bands that is supported by the terminal.

For example, the terminal may support capability sharing and support a maximum of four CCs. If multi-PDCCH based multi-TRP transmission is not performed, the terminal may support four CCs for CA/DC transmission. If multi-PDCCH based multi-TRP transmission is performed on one CC, the terminal may further support two CCs on which multi-PDCCH based multi-TRP transmission is not performed. If multi-PDCCH based multi-TRP transmission is performed on two CCs, the terminal cannot additionally support other CCs for transmission. For the multi-PDCCH based multi-TRP transmission, it is assumed that two TRPs perform simultaneous transmission.

Optionally, if the terminal supports one CC for multi-PDCCH based multi-TRP transmission, CA/DC transmission is not supported.

In another possible implementation, the second capability reporting information reported by the terminal to the network device is further used to indicate a maximum quantity of frequency domain resource units that is supported by the terminal and a type of the multi-downlink control information based transmission that is supported by the terminal.

Specifically, the terminal indicates, by using the second capability reporting information, whether multiple PDCCH based multi-TRP transmission and CA/DC can be shared, the type of the multiple PDCCH based multi-TRP transmission, and the maximum quantity of CCs/BWPs/bands that is supported by the terminal. For example, the terminal may support capability sharing, may support simultaneous transmission of a maximum of three TRPs, and may support a maximum of six CCs. If multi-PDCCH based multi-TRP transmission is not performed on a CC, the terminal may support six CCs for CA/DC transmission. If two TRPs perform multi-PDCCH based multi-TRP transmission on all CCs, the terminal supports a maximum of three CCs. If three TRPs perform multi-PDCCH based multi-TRP transmission on all CCs, the terminal supports a maximum of two CCs.

Figure 11:
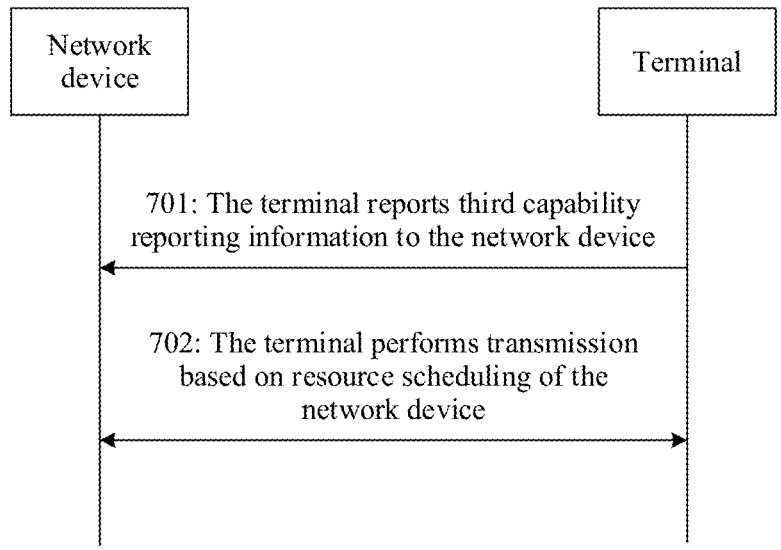
FIG. 11 is a flowchart of Embodiment 3 of a multi-downlink control information based transmission method according to an embodiment of this application.

FIG. 11 is a flowchart of Embodiment 3 of a multi-downlink control information based transmission method according to an embodiment of this application. The transmission method may be applied to a transmission indication system including a network device and a terminal. The network device may be any base station in the implementation environment shown in FIG. 1, and the terminal may be the terminal device in the implementation environment shown in FIG. 1.

In multi-PDCCH based multi-TRP transmission, a plurality of TRPs are independently scheduled and may have time and frequency deviations. In this case, a quantity of TAs/FFT windows/baseband processing processes that is supported by the terminal directly affects multi-PDCCH based multi-TRP transmission performance. If the network device side learns of the performance, it helps select, based on a capability of the terminal, whether to perform multi-PDCCH based multi-TRP transmission.

On this basis, referring to FIG. 11, in this embodiment of this application, the multi-downlink control information based transmission method includes the following operations.

Operation 701: The terminal reports third capability reporting information to the network device, where the third capability reporting information indicates a quantity of TAs, a quantity of fast Fourier transformation windows FFT windows, or a quantity of baseband processing processes that is supported by the terminal.

Operation 702: The terminal performs transmission based on resource scheduling of the network device.

In a possible implementation, the third capability reporting information indicates a quantity of TAs, a quantity of FFT windows, or a quantity of baseband processing processes that is supported by the terminal on one frequency domain resource unit.

Specifically, the terminal reports a supported quantity, for example, n, of TAs/FFT windows/baseband processing processes on one BWP/CC/band, where n is a positive integer, and especially n=2.

In another possible implementation, the third capability reporting information indicates a quantity of TAs, a quantity of FFT windows, or a quantity of baseband processing processes that is supported by the terminal on each frequency domain resource unit.

Specifically, the terminal reports a supported quantity, for example, n, of TAs/FFT windows/baseband processing processes on each BWP/CC/band, where n is a positive integer, and especially n=2.

Figure 12:
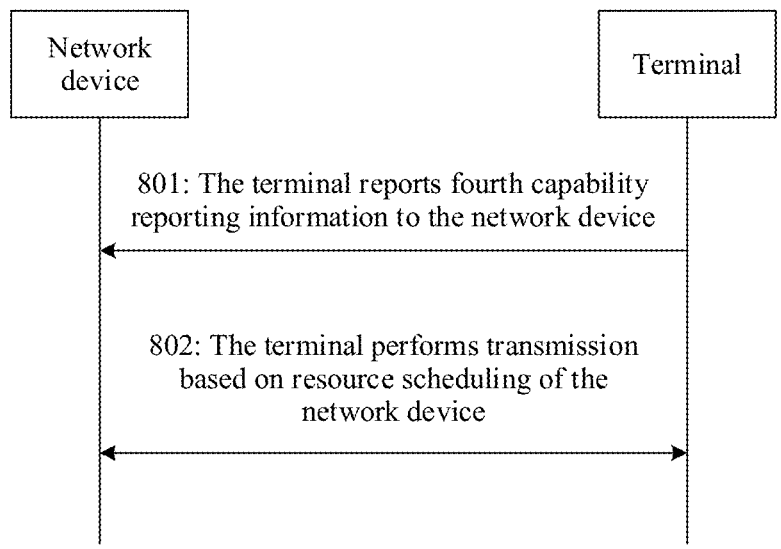
FIG. 12 is a flowchart of Embodiment 4 of a multi-downlink control information based transmission method according to an embodiment of this application.

FIG. 12 is a flowchart of Embodiment 4 of a multi-downlink control information based transmission method according to an embodiment of this application. The transmission method may be applied to a transmission indication system including a network device and a terminal. The network device may be any base station in the implementation environment shown in FIG. 1, and the terminal may be the terminal device in the implementation environment shown in FIG. 1.

In multi-PDCCH based multi-TRP transmission, a plurality of TRPs are independently scheduled and may have time and frequency deviations. In this case, whether the terminal supports partial resource overlap (partial overlap) between PDSCHs/PUSCHs directly affects multi-PDCCH based multi-TRP transmission performance. If the network device side learns of the performance, it helps select, based on a capability of the terminal, whether to perform multi-PDCCH based multi-TRP transmission.

On this basis, referring to FIG. 12, in this embodiment of this application, the multi-downlink control information based transmission method includes the following operations.

Operation 801: The terminal reports fourth capability reporting information to a network device, where the fourth capability reporting information indicates whether the terminal supports partial overlap between a plurality of physical uplink shared channels, or whether the terminal supports partial overlap between a plurality of physical downlink shared channels.

Operation 802: The terminal performs transmission based on resource scheduling of the network device.

In a possible implementation, the fourth capability reporting information indicates, on one frequency domain resource unit, whether the terminal supports partial overlap between a plurality of physical uplink shared channels, or whether the terminal supports partial overlap between a plurality of physical downlink shared channels.

Specifically, the fourth capability reporting information indicates whether the terminal supports partial resource overlap between PDSCHs/PUSCHs on one BWP/CC/band.

In a possible implementation, the fourth capability reporting information indicates, on each frequency domain resource unit, whether the terminal supports partial overlap between a plurality of physical uplink shared channels, or whether the terminal supports partial overlap between a plurality of physical downlink shared channels.

Specifically, the fourth capability reporting information indicates, on each BWP/CC/band, whether the terminal supports partial resource overlap between PDSCHs/PUSCHs.

In a possible implementation, the fourth capability reporting information indicates a quantity of partially overlapping physical uplink shared channels or a quantity of partially overlapping physical downlink shared channels that is supported by the terminal.

Specifically, the fourth capability reporting information indicates a quantity of PDSCHs/PUSCHs between which partial resource overlap is supported by the terminal.

Figure 13:
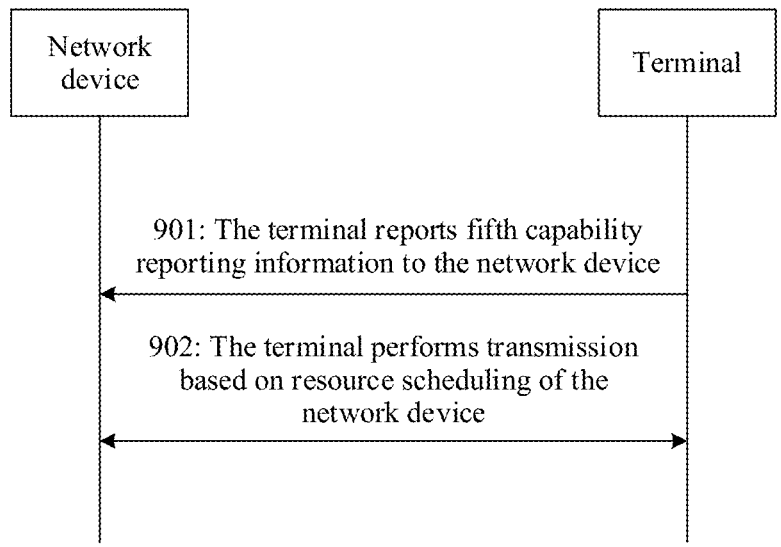
FIG. 13 is a flowchart of Embodiment 5 of a multi-downlink control information based transmission method according to an embodiment of this application.

FIG. 13 is a flowchart of Embodiment 5 of a multi-downlink control information based transmission method according to an embodiment of this application. The transmission method may be applied to a transmission indication system including a network device and a terminal. The network device may be any base station in the implementation environment shown in FIG. 1, and the terminal may be the terminal device in the implementation environment shown in FIG. 1.

In multi-PDCCH based multi-TRP transmission, a plurality of TRPs are independently scheduled and may have time and frequency deviations. In this case, whether the terminal supports a delay between PDSCHs/PUSCHs exceeding predetermined duration directly affects multi-PDCCH based multi-TRP transmission performance. If the network device side learns of the performance, it helps select, based on a capability of the terminal, whether to perform multi-PDCCH based multi-TRP transmission.

On this basis, referring to FIG. 13, in this embodiment of this application, the multi-downlink control information based transmission method includes the following operations.

Operation 901: The terminal reports fifth capability reporting information to a network device, where the fifth capability reporting information indicates whether the terminal supports a delay between a plurality of physical uplink shared channels exceeding predetermined duration, or whether the terminal supports a delay between a plurality of physical downlink shared channels exceeding predetermined duration. In this embodiment, the predetermined duration is a length of a cyclic prefix (cyclic prefix, CP).

Operation 902: The terminal performs transmission based on resource scheduling of the network device.

In a possible implementation, the fifth capability reporting information indicates, on one frequency domain resource unit, whether the terminal supports a delay between a plurality of physical uplink shared channels exceeding the predetermined duration, or whether the terminal supports a delay between a plurality of physical downlink shared channels exceeding the predetermined duration.

Specifically, the fifth capability reporting information indicates whether the terminal supports the delay between the PDSCHs/PUSCHs exceeding the CP on one BWP/CC/band.

In a possible implementation, the fifth capability reporting information indicates, on each frequency domain resource unit, whether the terminal supports a delay between a plurality of physical uplink shared channels exceeding the predetermined duration, or whether the terminal supports a delay between a plurality of physical downlink shared channels exceeding the predetermined duration.

Specifically, the fifth capability reporting information indicates whether the terminal supports the delay between the PDSCHs/PUSCHs exceeding the CP on each BWP/CC/band.

In a possible implementation, the fifth capability reporting information indicates a quantity of physical uplink shared channels with a delay therebetween exceeding the predetermined duration or a quantity of physical downlink shared channels with a delay therebetween exceeding the predetermined duration, where the quantity is supported by the terminal.

Specifically, the fifth capability reporting information indicates a quantity of PDSCHs/PUSCHs with a delay therebetween exceeding the CP, where the quantity is supported by the terminal.

Figure 14:
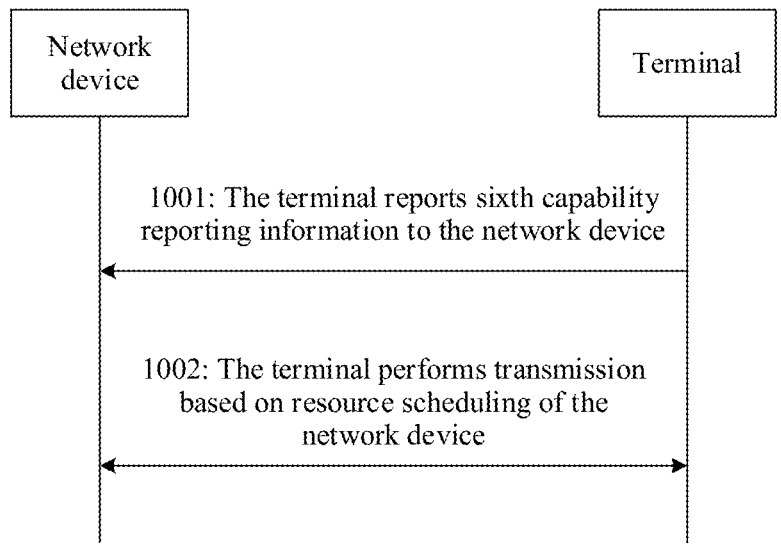
FIG. 14 is a flowchart of Embodiment 6 of a multi-downlink control information based transmission method according to an embodiment of this application.

FIG. 14 is a flowchart of Embodiment 6 of a multi-downlink control information based transmission method according to an embodiment of this application. The transmission method may be applied to a transmission indication system including a network device and a terminal. The network device may be any base station in the implementation environment shown in FIG. 1, and the terminal may be the terminal device in the implementation environment shown in FIG. 1.

In multi-PDCCH based multi-TRP transmission, a plurality of TRPs are independently scheduled and may have time and frequency deviations. In this case, a tolerance degree of the terminal for an error of time or frequency synchronization directly affects multi-PDCCH based multi-TRP transmission performance. If the network device learns of the performance, it helps select, based on a capability of the terminal, whether to perform multi-PDCCH based multi-TRP transmission.

On this basis, referring to FIG. 14, in this embodiment of this application, the multi-downlink control information based transmission method includes the following operations.

Operation 1001: The terminal reports sixth capability reporting information to a network device, where the sixth capability reporting information indicates a time or frequency synchronization range between downlink transmission resources that is supported by the terminal or indicates a time or frequency synchronization range between uplink transmission resources that is supported by the terminal.

Operation 1002: The terminal performs transmission based on resource scheduling of the network device.

In a possible implementation, the sixth capability reporting information indicates a time or frequency synchronization effect range between downlink transmission resources that is supported by the terminal on one frequency domain resource unit or indicates a time or frequency synchronization effect range between uplink transmission resources that is supported by the terminal.

Specifically, the terminal reports time/frequency synchronization between DL transmissions/UL transmissions (PDSCHs/PUSCHs) that is supported on one BWP/CC/band.

In another possible implementation, the sixth capability reporting information indicates a time or frequency synchronization effect range between downlink transmission resources that is supported by the terminal on each frequency domain resource unit or indicates a time or frequency synchronization effect range between uplink transmission resources that is supported by the terminal.

Specifically, the terminal reports a time/frequency synchronization range between DL transmissions/UL transmissions (PDSCHs/PUSCHs) that is supported by the UE on each BWP/CC/band.

For example, the terminal reports that the time synchronization range supported by the terminal on one BWP/CC/band or each BWP/CC/band is [−30 μs, 30 μs]. This capability may be measured per BC. In this case, the terminal reports one such capability on each BC. If the capability is measured per FS, the terminal reports one such capability on each FS. If the capability is measured per FSPC, the terminal reports one such capability on each FSPC.

The time or frequency synchronization range indicated by the sixth capability reporting information is a maximum amount of time or frequency synchronization. Specifically, the time/frequency synchronization range may have the following specified form: The maximum amount of time/frequency synchronization is directly indicated. Alternatively, time/frequency synchronization is quantized into "0, 1, 2, 3, 4, . . . " or "low, middle, high", to indicate a corresponding quantization degree.

Figure 15:
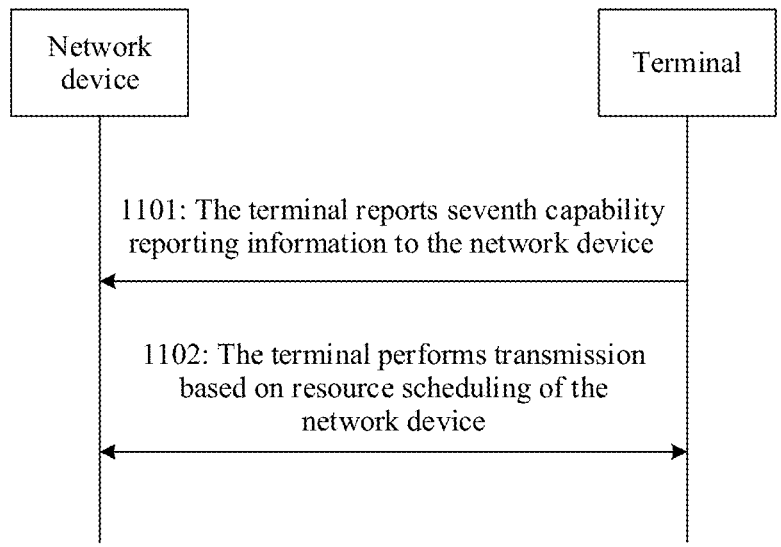
FIG. 15 is a flowchart of Embodiment 7 of a multi-downlink control information based transmission method according to an embodiment of this application.

FIG. 15 is a flowchart of Embodiment 7 of a multi-downlink control information based transmission method according to an embodiment of this application. The transmission method may be applied to a transmission indication system including a network device and a terminal. The network device may be any base station in the implementation environment shown in FIG. 1, and the terminal may be the terminal device in the implementation environment shown in FIG. 1.

Referring to FIG. 15, in this embodiment of this application, the multi-downlink control information based transmission method includes the following operations.

Operation 1101: The terminal reports seventh capability reporting information to a network device, where the seventh capability reporting information indicates a minimum time interval, supported by the terminal, between a plurality of PDCCHs corresponding to a plurality of scheduled PDSCHs/PUSCHs in a same time domain resource unit, or a minimum time interval, supported by the terminal, between a plurality of PDCCHs corresponding to a plurality of scheduled overlapping PDSCHs/PUSCHs in a same time domain resource unit.

Operation 1102: The terminal performs transmission based on resource scheduling of the network device.

In an implementation, the seventh capability reporting information reported by the terminal to the network device indicates a minimum time interval between two PDCCHs corresponding to two scheduled PDSCHs/PUSCHs of the terminal in a same time domain resource unit, or a minimum interval between two PDCCHs corresponding to two scheduled overlapping PDSCHs in a same time domain resource unit. For example, a PDSCH 1 and a PDSCH 2 are scheduled for the terminal, and the PDSCH 1 and the PDSCH 2 overlap on a time-frequency resource. The PDSCH 1 is scheduled by a PDCCH 1, and is located at an OFDM symbol N1. The PDSCH 2 is scheduled by a PDCCH 2, and is located at the OFDM symbol N2. N1 and N2 are separated by at least N symbols, and N is the seventh capability reporting information reported by the terminal.

It should be noted that, in a multi-DCI based transmission solution, the PDCCH and the PDSCH may not be simultaneously sent.

For example, a PDSCH 0 is scheduled by a PDCCH 0, the PDSCH 1 is scheduled by the PDCCH 1, the PDSCH 2 is scheduled by the PDCCH 2, and a PDSCH 3 is scheduled by a PDCCH 3. The PDSCH 0 and the PDSCH 1 overlap, that is, multi-DCI based transmission, namely, multi-DCI based transmission 0, is performed on the PDSCH 0 and the PDSCH 1. The PDSCH 2 and the PDSCH 3 overlap, that is, multi-DCI based transmission, namely, multi-DCI based transmission 1, is performed on the PDSCH 2 and the PDSCH 3. The minimum time interval between two PDCCHs in this embodiment refers to a minimum time interval between PDCCHs corresponding to same multi-DCI based transmission, for example, a time interval between the PDCCH 0 and the PDCCH 1, and a time interval between the PDCCH 2 and the PDCCH 3.

Figure 16:
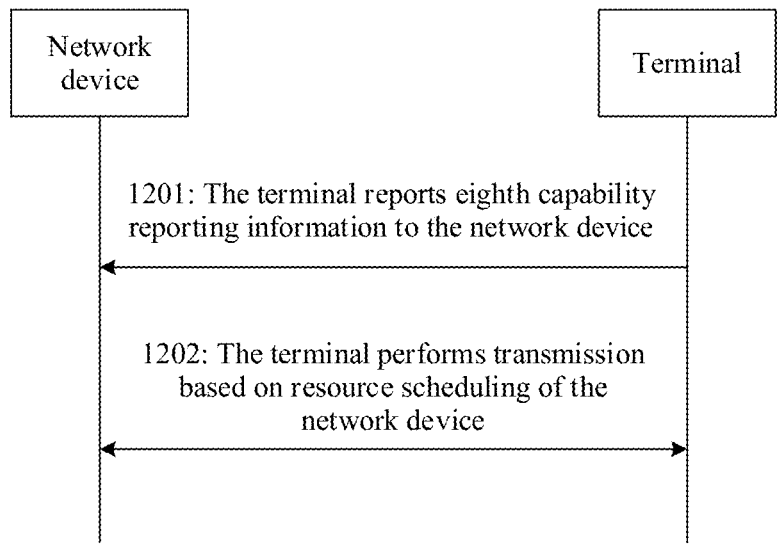
FIG. 16 is a flowchart of Embodiment 8 of a multi-downlink control information based transmission method according to an embodiment of this application.

FIG. 16 is a flowchart of Embodiment 8 of a multi-downlink control information based transmission method according to an embodiment of this application. The transmission method may be applied to a transmission indication system including a network device and a terminal. The network device may be any base station in the implementation environment shown in FIG. 1, and the terminal may be the terminal device in the implementation environment shown in FIG. 1.

Referring to FIG. 16, in this embodiment of this application, the multi-downlink control information based transmission method includes the following operations.

Operation 1201: The terminal reports eighth capability reporting information to the network device, where the eighth capability reporting information indicates a maximum time interval, supported by the terminal, between a plurality of PDCCHs corresponding to a plurality of scheduled PDSCHs/PUSCHs in a same time domain resource unit, or a maximum time interval, supported by the terminal, between a plurality of PDCCHs corresponding to a plurality of scheduled overlapping PDSCHs/PUSCHs in a same time domain resource unit.

Operation 1202: The terminal performs transmission based on resource scheduling of the network device.

In an implementation, the eighth capability reporting information reported by the terminal to the network device indicates a maximum time interval between two PDCCHs corresponding to two scheduled PDSCHs/PUSCHs of the terminal in a same time domain resource unit, or a maximum time interval between two PDCCHs corresponding to two scheduled overlapping PDSCHs/PUSCHs in a same time domain resource unit. For example, a PDSCH 1 and a PDSCH 2 are scheduled for the UE, and the PDSCH 1 and the PDSCH 2 overlap on a time-frequency resource. The PDSCH 1 is scheduled by a PDCCH 1, and is located at an OFDM symbol N1. The PDSCH 2 is scheduled by a PDCCH 2, and is located at an OFDM symbol N2. N1 and N2 are separated by a maximum of N symbols, and N is the eighth capability reporting information reported by the terminal.

Similar to the previous embodiment, the maximum time interval between two PDCCHs in this embodiment refers to a maximum time interval between PDCCHs corresponding to same multi-DCI based transmission, for example, a time interval between the PDCCH 0 and the PDCCH 1, and a time interval between the PDCCH 2 and the PDCCH 3.

Figure 17:
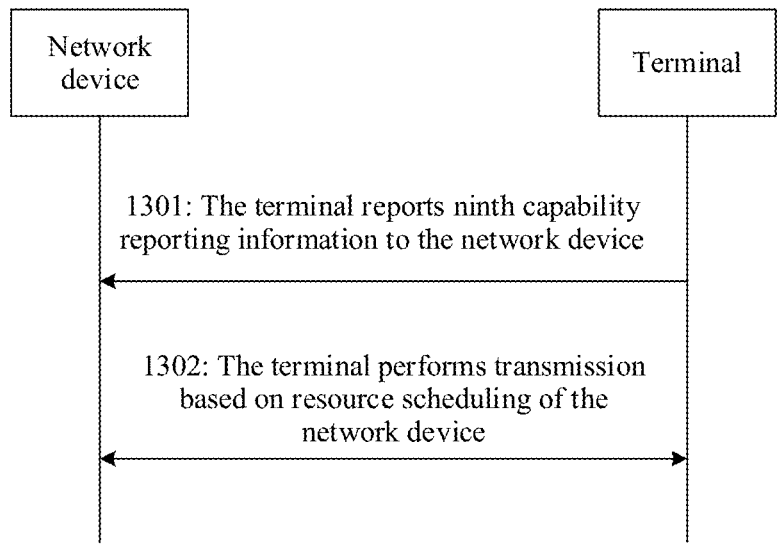
FIG. 17 is a flowchart of Embodiment 9 of a multi-downlink control information based transmission method according to an embodiment of this application.

FIG. 17 is a flowchart of Embodiment 9 of a multi-downlink control information based transmission method according to an embodiment of this application. The transmission method may be applied to a transmission indication system including a network device and a terminal. The network device may be any base station in the implementation environment shown in FIG. 1, and the terminal may be the terminal device in the implementation environment shown in FIG. 1.

Referring to FIG. 17, in this embodiment of this application, the multi-downlink control information based transmission method includes the following operations.

Operation 1301: The terminal reports ninth capability reporting information to a network device, where the ninth capability reporting information indicates whether the terminal supports joint PDCCH detection.

Operation 1302: The terminal performs transmission based on resource scheduling of the network device.

In this embodiment, the joint PDCCH detection has the following meanings:
(1) Detection of one or more PDCCHs depends on other PDCCHs. For example, the terminal detects a PDCCH 1, and learns, based on the PDCCH 1, whether a PDCCH 2 needs to be detected, or learns of a location at which the PDCCH 2 needs to be detected.
(2) Demodulation of a PDSCH depends on a plurality of pieces of DCI. For example, when demodulating the PDSCH 1, the terminal not only needs to use DCI 1 carried in the PDCCH 1, but also needs to use DCI 2 carried in the PDCCH 2.

Figure 18:
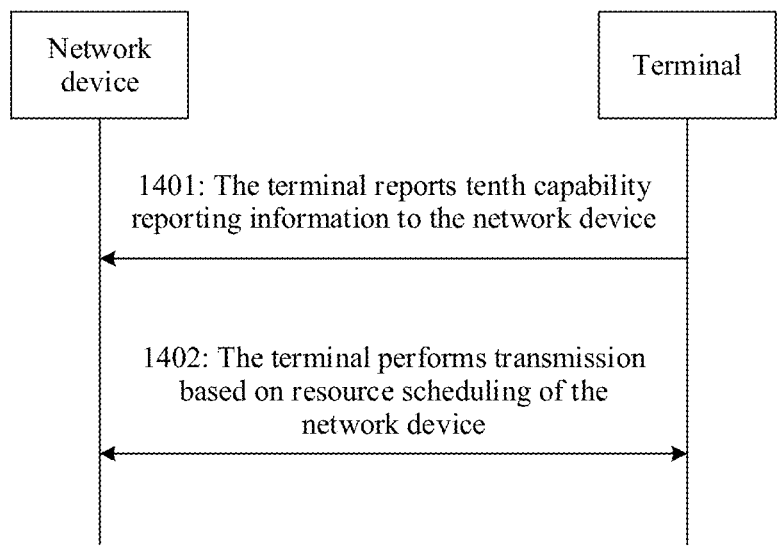
FIG. 18 is a flowchart of Embodiment 10 of a multi-downlink control information based transmission method according to an embodiment of this application.

FIG. 18 is a flowchart of Embodiment 10 of a multi-downlink control information based transmission method according to an embodiment of this application. The transmission method may be applied to a transmission indication system including a network device and a terminal. The network device may be any base station in the implementation environment shown in FIG. 1, and the terminal may be the terminal device in the implementation environment shown in FIG. 1.

Referring to FIG. 18, in this embodiment of this application, the multi-downlink control information based transmission method includes the following operations.

Operation 1401: The terminal reports tenth capability reporting information to the network device, where the tenth capability reporting information indicates whether the terminal supports joint detection of a plurality of PDSCHs/PUSCHs or joint detection of a plurality of overlapping PDSCHs/PUSCHs.

Operation 1402: The terminal performs transmission based on resource scheduling of the network device.

In an implementation, the terminal receives two PDSCHs: a PDSCH 1 and a PDSCH 2. Optionally, the two PDSCHs overlap on a time-frequency resource. The terminal has two processing methods:
(1) The PDSCH 1 and the PDSCH 2 are processed separately. When the PDSCH 1 is processed, it is assumed that the PDSCH 2 does not exist. When the PDSCH 2 is processed, it is assumed that PDSCH 1 does not exist.
(2) The PDSCH 1 and the PDSCH 2 are jointly processed, that is, the PDSCH 1 and the PDSCH 2 interfere with each other for demodulation.

In the method (2), there is a high requirement on the terminal, and not all terminals support this method. Therefore, the terminal needs to report a capability.

In conclusion, the first capability reporting information, the second capability reporting information, the third capability reporting information, the fourth capability reporting information, the fifth capability reporting information, the sixth capability reporting information, the seventh capability reporting information, the eighth capability reporting information, the ninth capability reporting information, and the tenth capability reporting information that are reported by the terminal may be separately reported, or may be combined for joint reporting. Unless otherwise specified, the capability reporting information may be specific to a PDSCH, may be specific to a PUSCH, may be specific to a PDSCH and a PUSCH, or may be specific to each feature set (FS) or specific to each terminal or each band combination (BC).

In the foregoing descriptions of Embodiment 1 to Embodiment 10, the terminal actively reports capabilities for multi-downlink control information based transmission of the terminal. In an implementation process, the network device may directly indicate, without reference to the capability reported by the terminal, types or a quantity of multi-downlink control information based transmissions or types and a quantity of multi-downlink control information based transmissions. Certainly, the network device may also indicate types or a quantity of multi-downlink control information based transmissions of the terminal or types and a quantity of multi-downlink control information based transmissions of the terminal after adjusting the capability reported by the terminal.

The following uses an example in which the network device delivers first indication information to the terminal for description. Second indication information, third indication information, fourth indication information, fifth indication information, sixth indication information, seventh indication information, eighth indication information, ninth indication information, and tenth indication information corresponding to various capabilities such as the second capability reporting indication information, the third capability reporting information, the fourth capability reporting information, the fifth capability reporting information, the sixth capability reporting information, the seventh capability reporting information, the eighth capability reporting information, the ninth capability reporting information, and the tenth capability reporting information are similar to this, and details are not described again.

Figure 19:
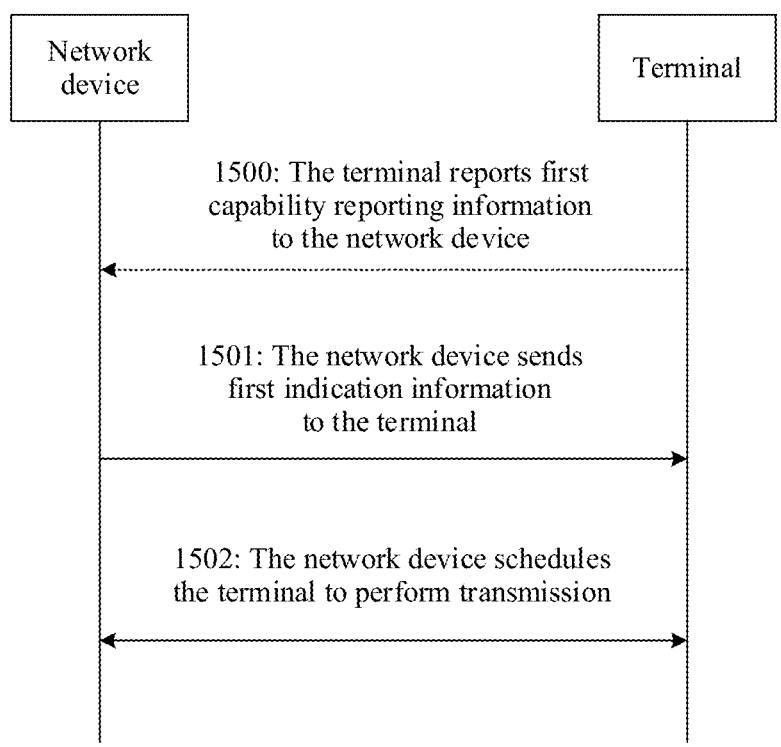
FIG. 19 is a flowchart of Embodiment 11 of a multi-downlink control information based transmission method according to an embodiment of this application.

FIG. 19 is a flowchart of Embodiment 11 of a multi-downlink control information based transmission method according to an embodiment of this application. The transmission method may be applied to a transmission indication system including a network device and a terminal. The network device may be any base station in the implementation environment shown in FIG. 1, and the terminal may be the terminal device in the implementation environment shown in FIG. 1.

Referring to FIG. 19, the multi-downlink control information based transmission method includes the following operations.

Operation 1501: The network device delivers first indication information to the terminal, where the first indication information indicates, to the terminal, at least one of types or a quantity of multi-downlink control information based transmissions.

Operation 1501 may be performed by the transceiver module 304 or the transceiver 404 of the network device.

Optionally, the network device may send the first indication information to the terminal by using at least one of physical layer signaling, media access control (MAC) layer signaling, or radio resource control (RRC) signaling. For example, the network device sends the first indication information to the terminal by using the physical layer signaling, the MAC layer signaling, or the RRC signaling, or the network device sends the first indication information to the terminal by using the physical layer signaling and the RRC signaling, or the network device sends, to the terminal by using the physical layer signaling and the MAC layer signaling, information about a capability to support multi-downlink control information based transmission.

Certainly, during actual application, the network device may alternatively send, to the terminal by using signaling other than the foregoing three types of signaling, the information about the capability to support multi-downlink control information based transmission. In this embodiment of this application, details are not described herein.

It should be noted that, usually, a sending periodicity of the first indication information is relatively long. Therefore, the MAC layer signaling or the RRC signaling may be preferably used to send, to the terminal, the information about the capability to support multi-downlink control information based transmission. However, when a reference signal resource used by the terminal to perform channel measurement needs to be frequently or dynamically indicated, the physical layer signaling may be preferably used to send, to the terminal, the information about the capability to support multi-downlink control information based transmission. Optionally, the information about the capability to support multi-downlink control information based transmission may be sent by using one message, or may be sent by using a plurality of messages. This is not limited in this embodiment of this application.

Operation 1502: The network device schedules the terminal to perform transmission.

Operation 1502 may be performed by the processing module 302 or the processor 402 of the network device.

Optionally, before operation 1501, the method may further include the following operation:

Operation 1500: The network device receives first capability reporting information reported by the terminal, where the first capability reporting information indicates at least one of information indicating whether the terminal supports multi-downlink control information based transmission, a supported type of multi-downlink control information based transmission, or a supported quantity of multi-downlink control information based transmissions.

For the first indication information in this embodiment, refer to the descriptions of the first capability reporting information in any one of the foregoing embodiments. The first capability reporting information is described from a perspective of reporting by the terminal, and the first indication information is configured by the network device for the terminal. Content, functions, effects, and parameter forms of the first capability reporting information and the first indication information are the same. For brevity, details are not described herein again.

Similarly, the second to the tenth indication information are also correspond to the second to the tenth capability reporting information. For brevity, details are not described herein again.

The character "/" in this specification generally indicates an "or" relationship between the associated objects.

In this specification, values of N, N1, N2, m, and n are integers greater than or equal to 1.

The sequence numbers of the foregoing embodiments of this application are merely for illustrative purposes, and are not intended to indicate priorities of the embodiments.

A person of ordinary skill in the art may understand that all or some of the operations of the embodiments may be implemented by hardware or a program instructing related hardware. The program may be stored in a computer-readable storage medium. The storage medium may be a read-only memory, a magnetic disk, a compact disc, or the like.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A transmission method applied to a processing apparatus, comprising:
   determining first capability reporting information of the processing apparatus based on a capability of the processing apparatus to receive from and transmit to multiple transmission reception points (TRPs), wherein the multiple TRPs each transmit downlink control information (DCI) to the processing apparatus;
   reporting the first capability reporting information to a network device, wherein the first capability reporting information indicates a type of multi-DCI-based transmission that is supported by the processing apparatus, and the type indicates a quantity of overlapping physical downlink shared channels or physical uplink shared channels that is supported by the processing apparatus on one resource unit;
   receiving resource scheduling from the network device, wherein the resource scheduling corresponds to the first capability reporting information; and
   performing transmission to one or more of the multiple TRPs based on the resource scheduling determined by the network device.

2. The transmission method according to claim 1, wherein the first capability reporting information further indicates:
   whether the processing apparatus supports an overlapping physical downlink shared channel or physical uplink shared channel on one time-frequency resource unit; or
   whether the processing apparatus supports an overlapping physical downlink shared channel or physical uplink shared channel on one frequency domain resource unit; or
   whether the processing apparatus supports an overlapping physical downlink shared channel or physical uplink shared channel on one time domain resource unit; or
   whether the processing apparatus supports an overlapping physical downlink shared channel or physical uplink shared channel on one time-frequency resource segment, wherein the time-frequency resource segment comprises one or more time-frequency resource units; or
   whether the processing apparatus supports an overlapping physical downlink shared channel or physical uplink shared channel on one frequency domain resource segment, wherein the frequency domain resource segment comprises one or more frequency domain resource units; or
   whether the processing apparatus supports an overlapping physical downlink shared channel or physical uplink shared channel on one time domain resource segment, wherein the time domain resource segment comprises one or more time domain resource units.

3. The transmission method according to claim 1, wherein the type comprises:
   a maximum quantity of overlapping physical downlink shared channels or physical uplink shared channels that is supported by the processing apparatus on one time-frequency resource unit; or
   a maximum quantity of overlapping physical downlink shared channels or physical uplink shared channels that is supported by the processing apparatus on one frequency domain resource unit; or
   a maximum quantity of overlapping physical downlink shared channels or physical uplink shared channels that is supported by the processing apparatus on one time domain resource unit.

4. The transmission method according to claim 3, wherein the maximum quantity belongs to {1, 2}, {1, 2, 3}, or {1, 2, 3, 4}.

5. The transmission method according to claim 1, wherein the first capability reporting information indicates that a quantity of multi-DCI-based transmissions that is supported by the processing apparatus is a transmission quantity, and the transmission quantity indicates a total quantity of DCI-based transmissions that is supported by the processing apparatus on one resource segment.

6. The transmission method according to claim 1, wherein the first capability reporting information indicates that a quantity of multi-DCI-based transmissions that is supported by the processing apparatus is a resource quantity, and the resource quantity comprises:
   a quantity of time-frequency resource units for the multi-DCI-based transmission that is supported by the processing apparatus; or
   a quantity of frequency domain resource units for the multi-DCI-based transmission that is supported by the processing apparatus; or
   a quantity of time domain resource units for the multi-DCI-based transmission that is supported by the processing apparatus.

7. The transmission method according to claim 1, wherein the first capability reporting information further indicates a resource identifier for the multi-DCI-based transmission that is supported by the processing apparatus, and the resource identifier comprises:
   an identifier of a time-frequency resource unit for the multi-DCI-based transmission that is supported by the processing apparatus; or
   an identifier of a frequency domain resource unit for the multi-DCI-based transmission that is supported by the processing apparatus; or
   an identifier of a time domain resource unit for the multi-DCI-based transmission that is supported by the processing apparatus.

8. The transmission method according to claim 1, wherein the first capability reporting information indicates that a quantity of multi-DCI-based transmissions that is supported by the processing apparatus is a channel quantity, and the channel quantity is a quantity of overlapping physical downlink shared channels or physical uplink shared channels that is supported by the processing apparatus on one resource segment, and the channel quantity comprises:
   a maximum quantity of overlapping physical downlink shared channels or physical uplink shared channels that is supported by the processing apparatus on one time-frequency resource segment, wherein the time-frequency resource segment comprises one or more time-frequency resource units; or
   a maximum quantity of overlapping physical downlink shared channels or physical uplink shared channels that is supported by the processing apparatus on one frequency domain resource segment, wherein the frequency domain resource segment comprises one or more frequency domain resource units; or
   a maximum quantity of overlapping physical downlink shared channels or physical uplink shared channels that is supported by the processing apparatus on one time domain resource segment, wherein the time domain resource segment comprises one or more time domain resource units.

9. A processing apparatus, comprising:
   at least one processor configured with processor-executable instructions to perform operations comprising:
   determining first capability reporting information based on a capability of the processing apparatus to receive from and transmit to multiple transmission reception points (TRPs), wherein the multiple TRPs each transmit downlink control information (DCI) to the processing apparatus;
   reporting the first capability reporting information to a network device, wherein the first capability reporting information indicates a type of multi-DCI-based transmission that is supported by the processing apparatus, and the type indicates a quantity of overlapping physical downlink shared channels or physical uplink shared channels that is supported by the processing apparatus on one resource unit; and
   performing transmission to one or more of the multiple TRPs based on resource scheduling of the network device.

10. The processing apparatus according to claim 9, wherein the first capability reporting information further indicates:
   whether the processing apparatus supports an overlapping physical downlink shared channel or physical uplink shared channel on one time-frequency resource unit; or
   whether the processing apparatus supports an overlapping physical downlink shared channel or physical uplink shared channel on one frequency domain resource unit; or
   whether the processing apparatus supports an overlapping physical downlink shared channel or physical uplink shared channel on one time domain resource unit; or
   whether the processing apparatus supports an overlapping physical downlink shared channel or physical uplink shared channel, wherein the time-frequency resource segment comprises one or more time-frequency resource units on one time-frequency resource segment; or
   whether the processing apparatus supports an overlapping physical downlink shared channel or physical uplink shared channel, wherein the frequency domain resource segment comprises one or more frequency domain resource units on one frequency domain resource segment; or
   whether the processing apparatus supports an overlapping physical downlink shared channel or physical uplink shared channel on one time domain resource segment, wherein the time domain resource segment comprises one or more time domain resource units.

11. The processing apparatus according to claim 9, wherein the type comprises:

a maximum quantity of overlapping physical downlink shared channels or physical uplink shared channels that is supported by the processing apparatus on one time-frequency resource unit; or a maximum quantity of overlapping physical downlink shared channels or physical uplink shared channels that is supported by the processing apparatus on one frequency domain resource unit; or a maximum quantity of overlapping physical downlink shared channels or physical uplink shared channels that is supported by the processing apparatus on one time domain resource unit.

12. The processing apparatus according to claim 11, wherein the maximum quantity belongs to {1, 2}, {1, 2, 3}, or {1, 2, 3, 4}.

13. The processing apparatus according to claim 9, wherein the first capability reporting information indicates that a quantity of multi-DCI-based transmissions that is supported by the processing apparatus is a transmission quantity, and the transmission quantity indicates a total quantity of multi-DCI-based transmissions that is supported by the processing apparatus on one resource segment.

14. The processing apparatus according to claim 9, wherein the first capability reporting information indicates that a quantity of multi-DCI-based transmissions that is supported by the processing apparatus is a resource quantity, and the resource quantity comprises:

a quantity of time-frequency resource units for the multi-DCI-based transmission that is supported by the processing apparatus; or a quantity of frequency domain resource units for the multi-DCI-based transmission that is supported by the processing apparatus; or a quantity of time domain resource units for the multi-DCI-based transmission that is supported by the processing apparatus.

15. The processing apparatus according to claim 9, wherein the first capability reporting information further indicates a resource identifier for the multi-DCI-based transmission that is supported by the processing apparatus, and the resource identifier comprises:

an identifier of a time-frequency resource unit for the multi-DCI-based transmission that is supported by the processing apparatus; or an identifier of a frequency domain resource unit for the multi-DCI-based transmission that is supported by the processing apparatus; or an identifier of a time domain resource unit for the multi-DCI-based transmission that is supported by the processing apparatus.

16. The processing apparatus according to claim 9, wherein the first capability reporting information indicates that a quantity of multi-DCI-based transmissions that is supported by the processing apparatus is a channel quantity, and the channel quantity is a quantity of overlapping physical downlink shared channels or physical uplink shared channels that is supported by the processing apparatus on one resource segment, and the channel quantity comprises:

a maximum quantity of overlapping physical downlink shared channels or physical uplink shared channels that is supported by the processing apparatus on one time-frequency resource segment, wherein the time-frequency resource segment comprises one or more time-frequency resource units; or a maximum quantity of overlapping physical downlink shared channels or physical uplink shared channels that is supported by the processing apparatus on one frequency domain resource segment, wherein the frequency domain resource segment comprises one or more frequency domain resource units; or a maximum quantity of overlapping physical downlink shared channels or physical uplink shared channels that is supported by the processing apparatus on one time domain resource segment, wherein the time domain resource segment comprises one or more time domain resource units.

17. A non-transitory computer-readable storage medium storing instructions that when run by at least one processor of a processing apparatus cause the processing apparatus to:

determine first capability reporting information based on a capability of the processing apparatus to receive from and transmit to multiple transmission reception points (TRPs), wherein the multiple TRPs each transmit downlink control information (DCI) to the processing apparatus;

report the first capability reporting information to a network device, wherein the first capability reporting information indicates that a quantity of multi-DCI-based transmissions that is supported by the processing apparatus is a transmission quantity, and the transmission quantity indicates a total quantity of DCI-based transmissions that is supported by the processing apparatus on one resource segment; and wherein the first capability reporting information further indicates a resource identifier for the multi-DCI-based transmission that is supported by the processing apparatus, and the resource identifier comprises: an identifier of a time-frequency resource unit for the multi-DCI-based transmission that is supported by the processing apparatus, an identifier of a frequency domain resource unit for the multi-DCI-based transmission that is supported by the processing apparatus, or an identifier of a time domain resource unit for the multi-DCI-based transmission that is supported by the processing apparatus; and perform transmission to one or more of the multiple TRPs based on resource scheduling of the network device.

* * * * *

UNITED STATES PATENT AND TRADEMARK OFFICE
CERTIFICATE OF CORRECTION

PATENT NO. : 12,279,267 B2  
APPLICATION NO. : 17/401503  
DATED : April 15, 2025  
INVENTOR(S) : Shibin Ge et al.

Page 1 of 1

It is certified that error appears in the above-identified patent and that said Letters Patent is hereby corrected as shown below:

On the Title Page (57), Abstract, Line 13, delete "multi-DCI (DCI)-based" and insert -- multi-DCI-based --, therefor.

(57), Abstract, Lines 14-15, delete "multi-DCI DCI-based" and insert -- multi-DCI-based --, therefor.

Signed and Sealed this  
Fifteenth Day of July, 2025

Coke Morgan Stewart  
*Acting Director of the United States Patent and Trademark Office*